MARVIN C. APPLEGATE,
CONRAD M. FRITZ,
INVENTORS

BY

ATTORNEY

MARVIN C. APPLEGATE,
CONRAD M. FRITZ,
INVENTORS

BY

ATTORNEY

Dec. 15, 1959  M. C. APPLEGATE ET AL  2,916,976
AUTOMATIC PHOTOGRAPHIC APPARATUS
Filed Nov. 12, 1954  10 Sheets-Sheet 4
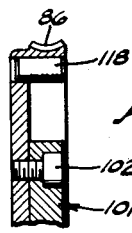
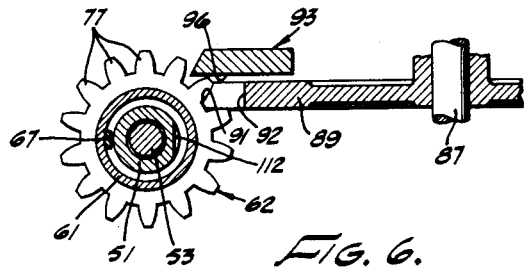
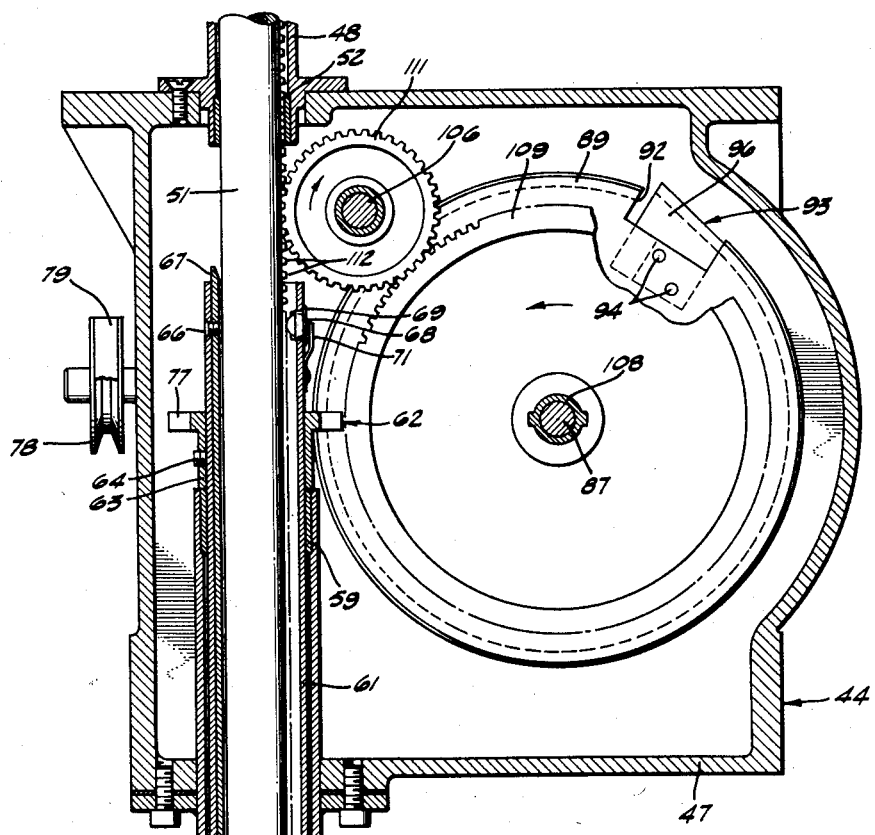
MARVIN C. APPLEGATE,
CONRAD M. FRITZ,
INVENTORS
BY 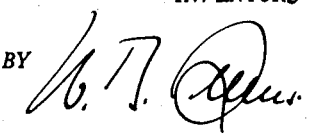
ATTORNEY

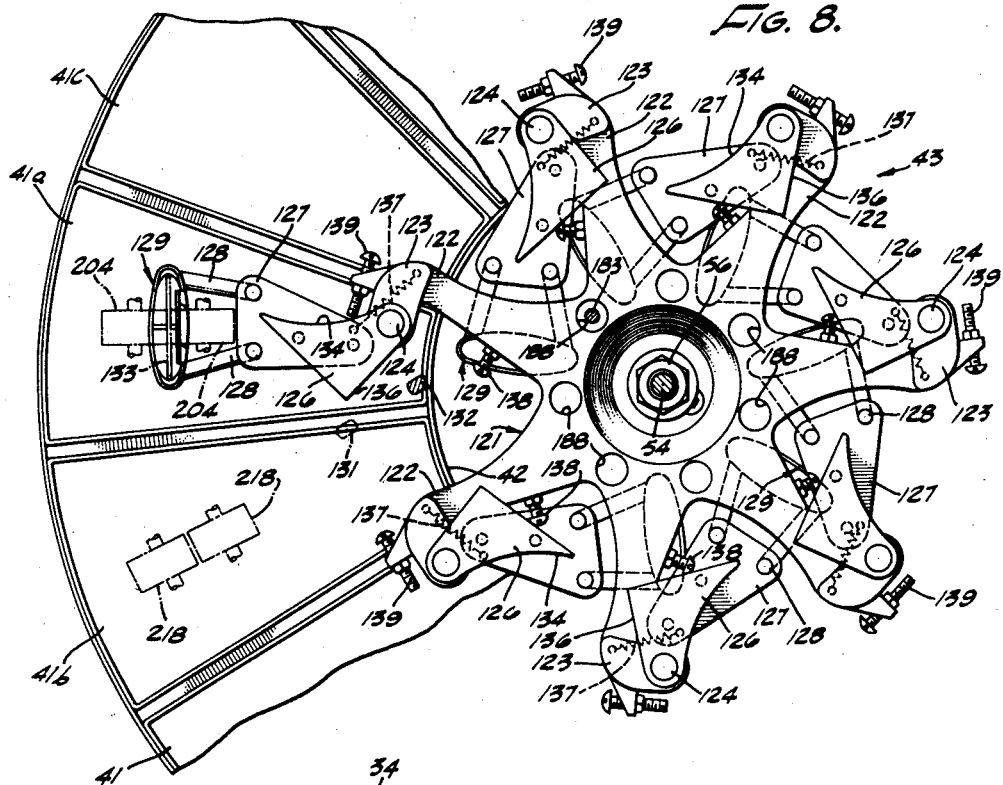
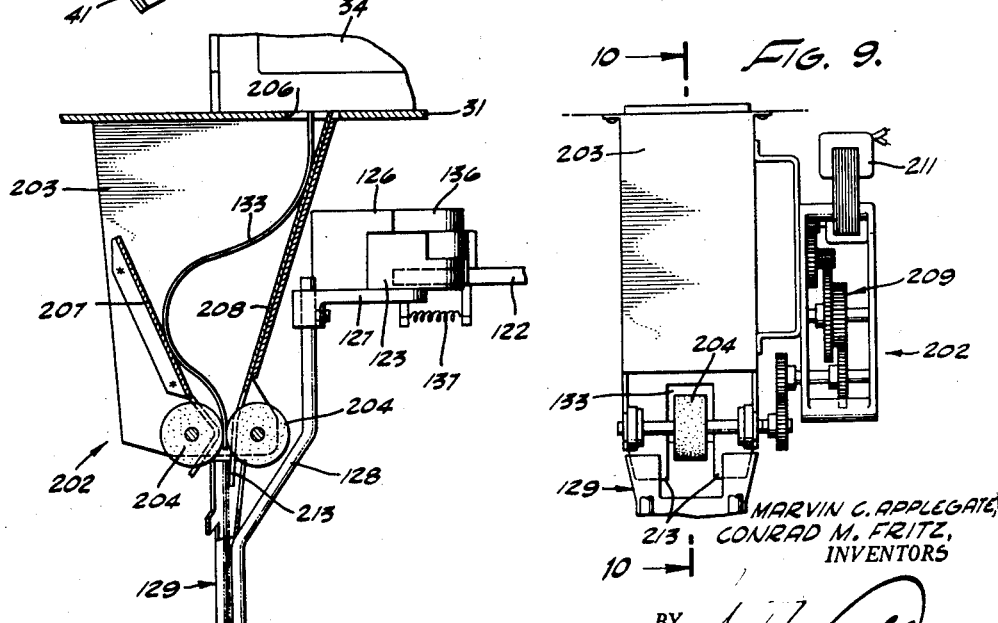

Dec. 15, 1959    M. C. APPLEGATE ET AL    2,916,976
AUTOMATIC PHOTOGRAPHIC APPARATUS
Filed Nov. 12, 1954    10 Sheets-Sheet 6
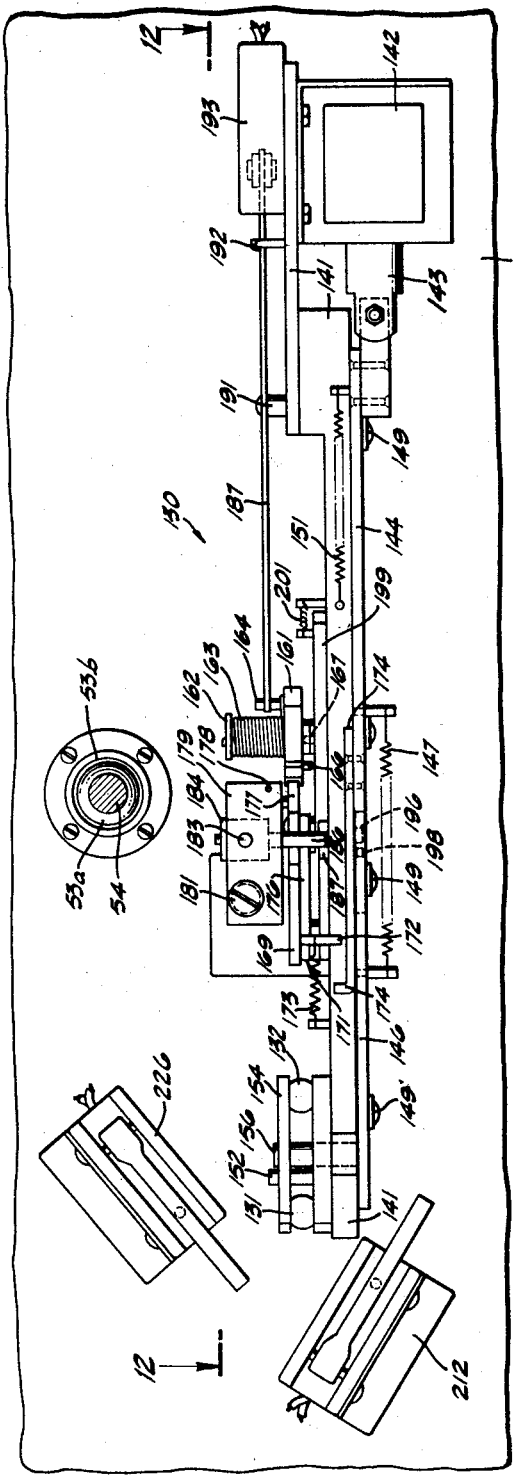
MARVIN C. APPLEGATE,
CONRAD M. FRITZ
INVENTORS
BY
ATTORNEY

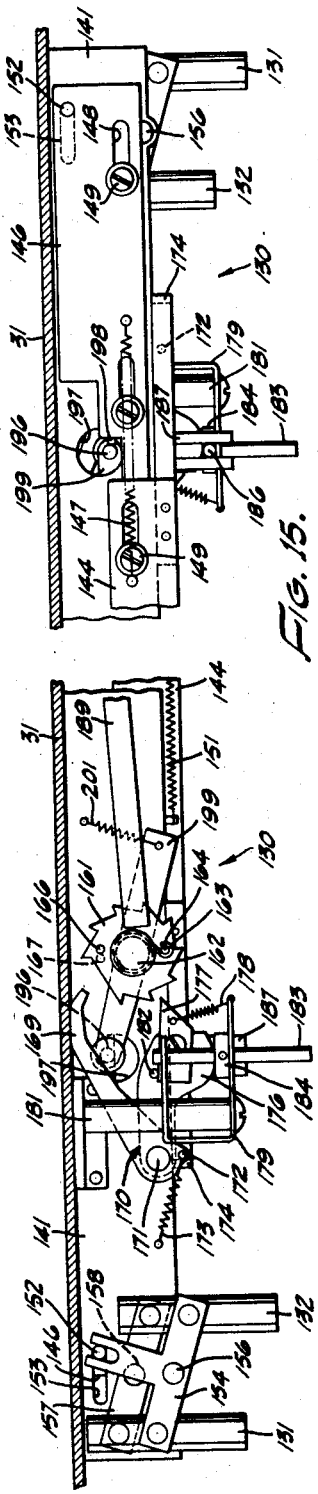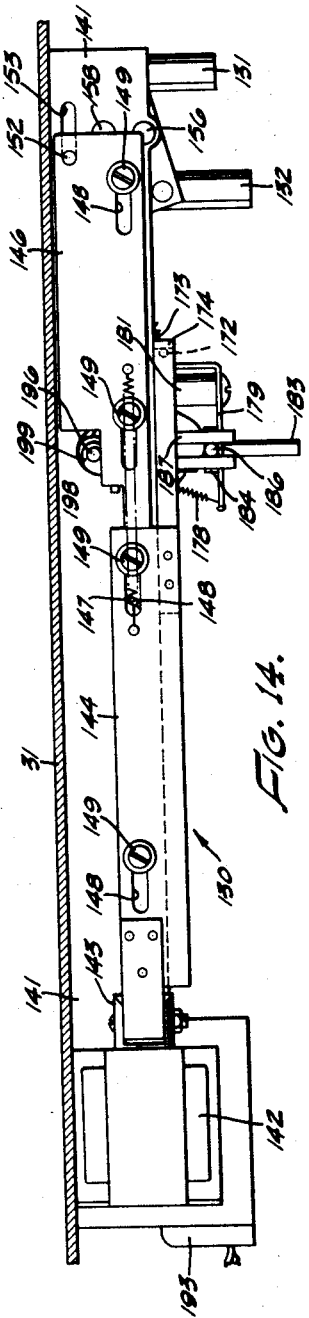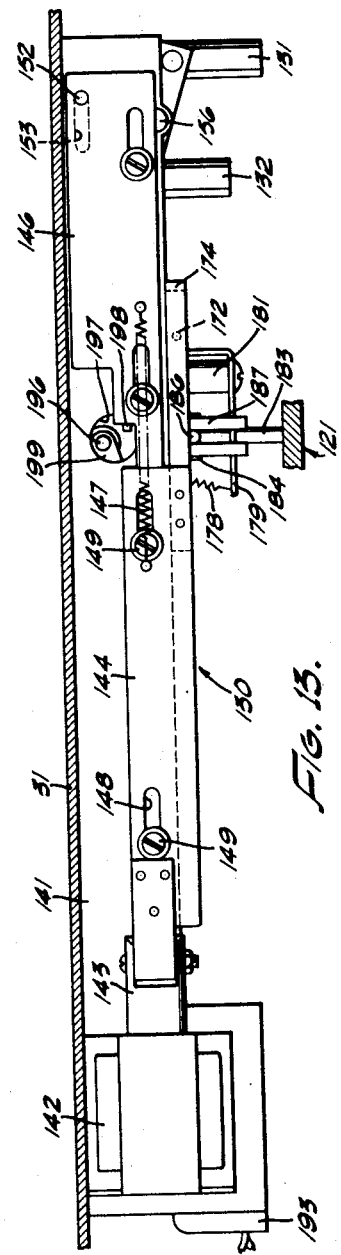

Dec. 15, 1959   M. C. APPLEGATE ET AL   2,916,976
AUTOMATIC PHOTOGRAPHIC APPARATUS
Filed Nov. 12, 1954   10 Sheets-Sheet 8
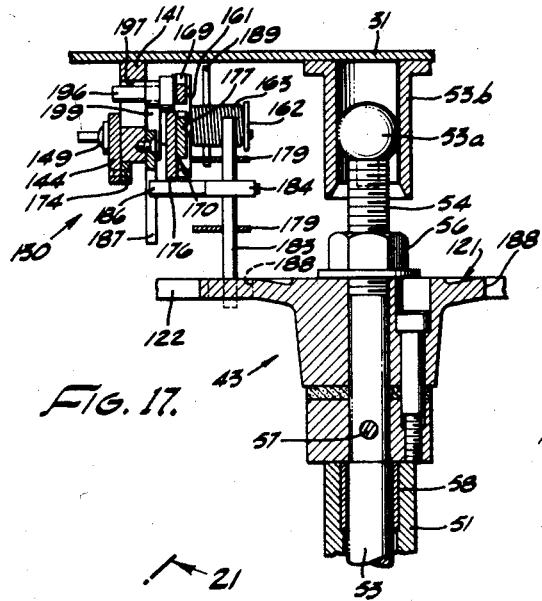
FIG. 17.
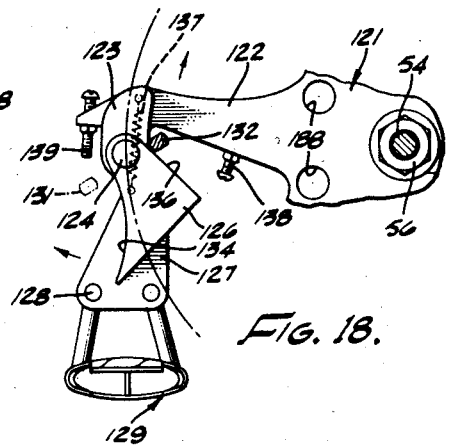
FIG. 18.
FIG. 19.
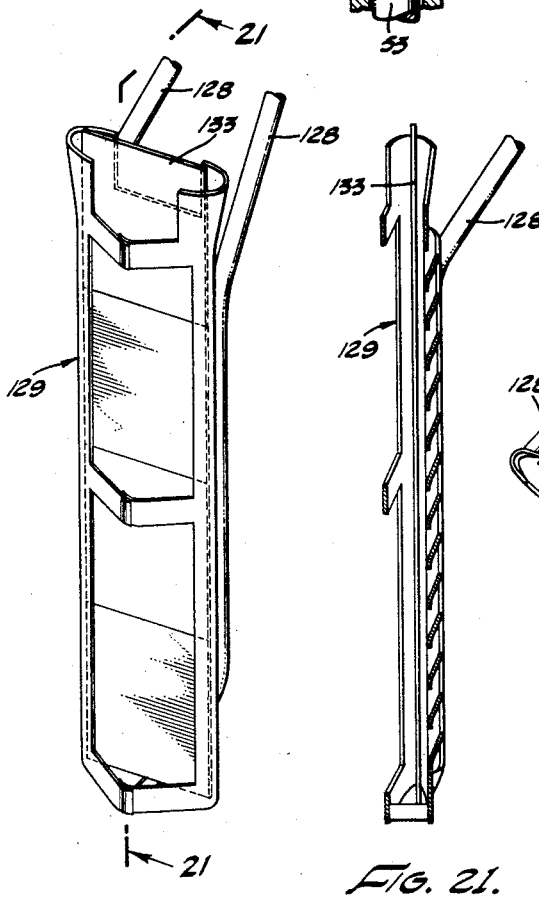
FIG. 20.   FIG. 21.
MARVIN C. APPLEGATE,
CONRAD M. FRITZ,
INVENTORS
BY
ATTORNEY Dec. 15, 1959    M. C. APPLEGATE ET AL    2,916,976
AUTOMATIC PHOTOGRAPHIC APPARATUS
Filed Nov. 12, 1954    10 Sheets-Sheet 9
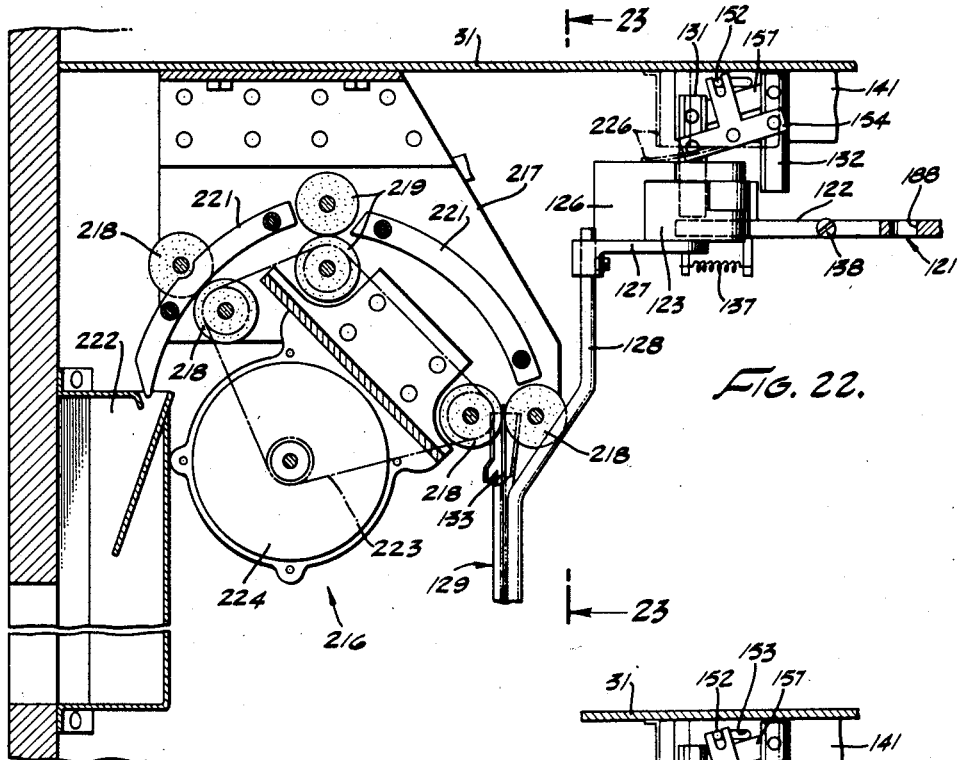
FIG. 22.
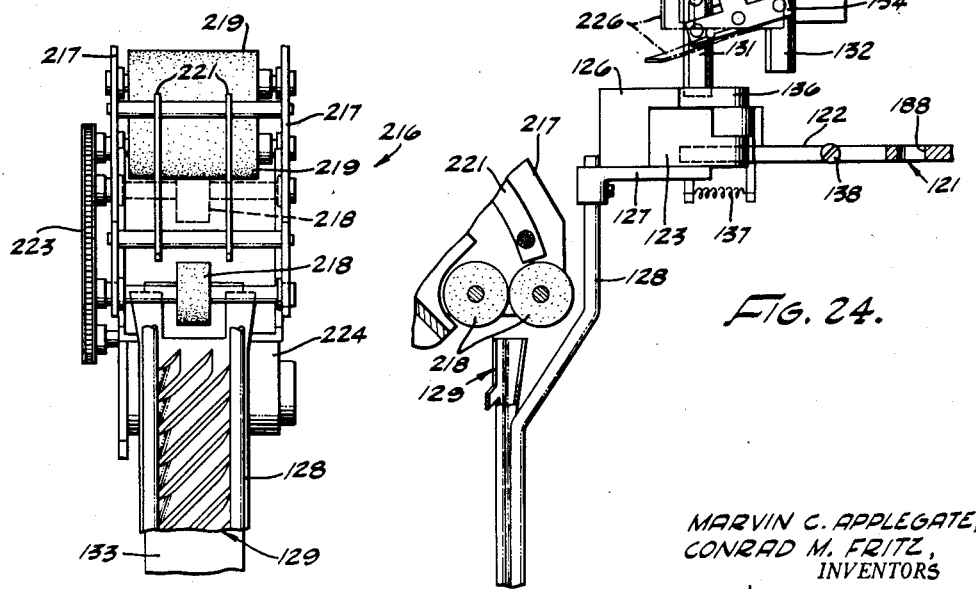
FIG. 23.
FIG. 24.
MARVIN C. APPLEGATE,
CONRAD M. FRITZ,
INVENTORS
BY
ATTORNEY Dec. 15, 1959   M. C. APPLEGATE ET AL   2,916,976
AUTOMATIC PHOTOGRAPHIC APPARATUS Filed Nov. 12, 1954   10 Sheets-Sheet 10

MARVIN C. APPLEGATE,
CONRAD M. FRITZ,
INVENTORS

BY

ATTORNEY

United States Patent Office 2,916,976
Patented Dec. 15, 1959

2,916,976

AUTOMATIC PHOTOGRAPHIC APPARATUS

Marvin C. Applegate, La Canada, and Conrad M. Fritz, West Los Angeles, Calif., assignors, by mesne assignments, to Philip S. Allen, Carlsbad, Calif., an individual Application November 12, 1954, Serial No. 468,178

34 Claims. (Cl. 95—14)

This invention relates to a photographic apparatus, and more particularly to a coin operated picture machine which exposes films automatically and develops a plurality of such films at the same time.

In Patent No. 2,380,378 for an Automatic Photographic Apparatus, issued to Philip S. Allen on July 31, 1945, and in the more recent Patent No. 2,541,016 for an Apparatus for Taking and Developing a Series of Pictures in Sequence on a Film Strip, issued to the same inventor on February 13, 1951, there are shown and described two forms of a coin operated apparatus by which an operator may take a series of pictures of himself on a film strip, and which develops the film strip automatically and delivers it to the operator in a very short period of time. In spite of the fact that this developing time is short, on the order of several minutes, it will be readily appreciated that where a number of persons are waiting to have their pictures taken, for example in crowded places such as railway depots or amusement parks, considerable business is lost in that the persons last in line may refuse to wait while the pictures of persons ahead of them are being taken and also developed. For example, let it be assumed that the developing time is two minutes and that each person in line requires two minutes to read the instructions inside the picture taking booth, and pose during taking of the pictures. The total time per person is then four minutes, which means that where four people are in line the fourth person will have to wait twelve minutes before his picture is taken.

Because of the very considerable amount of business lost by virtue of persons refusing to wait any substantial length of time before their pictures are taken, it has previously been proposed to develop the pictures of one or more persons at the same time that the picture of a subsequent person is being exposed, so that the only delay is in the time spent by each person in the picture taking booth and there is no necessity that persons subsequent in line wait while the pictures of prior persons are developed. Heretofore, however, such constructions have not been feasible since they have either resulted in a large amount of pollution or contamination between the fluids in the developing tanks into which the pictures are sequentially immersed while being developed, or have necessitated the use of very expensive and bulky chemical supply and overflow means in order to minimize such pollution. It will be understood that where a single film carrier is immersed sequentially in a number of tanks containing various developing or rinsing fluids, only a slight amount of fluid will be carried by the single carrier from one tank to the other and the amount of inter-tank pollution will be relatively small. However, where there are a substantial number of carriers all of which are dipped sequentially into the developing tanks regardless of whether the carriers contain film strips or are empty, the amount of unnecessary contamination and fluid loss will be so excessive that the machine may not be successfully operated unless expensive chemical replenishing and anti-pollution means are provided.

In view of the above factors characteristic of automatic picture taking apparatus of the type indicated, it is an object of the present invention to provide an apparatus capable of developing automatically a substantial number of pictures or film strips at the same time, yet in which the amount of loss and inter-tank pollution or contamination is minimized without the necessity of employing any automatic chemical and water supply or drainage means.

Another object of the invention is to provide an automatic picture taking apparatus incorporating a plurality of film carriers which are maintained in an inoperative position, at which they will not be dipped in developing tanks, unless and until they actually contain a film strip to be processed, the amount of inter-tank contamination thus being reduced to that necessarily effected by carriers containing film strips.

A further object of the invention is to provide means for automatically shifting a film carrier to operative position when there is a film to be processed, but for maintaining the remaining carriers in inoperative position until there are additional films to be processed, the only carriers dipped in the developing tanks then being the ones which actually contain films in the process of development.

A further object of the invention is to provide an improved means for swinging film carriers between operative and inoperative positions, and to provide improved means for maintaining the developing apparatus in operation for the time period necessary to develop completely the last picture taken by the apparatus and regardless of the number of pictures taken or the time of their taking.

An additional object is to provide means for preventing interference and fouling between the film carriers and the film conveyor and carrier selector portions of the apparatus.

A further object is to provide timer means associated directly with the film carrier portions of the apparatus as distinguished from the drive motor portions thereof, so that there is no necessity for providing a separate drive between the drive motor and the timer means.

These and other objects and advantages of the invention will be more fully set forth in the following specification and claims considered in connection with the attached drawings to which they relate.

In the drawings:

Figure 5 is an enlarged vertical section along line 5—5 of Figure 1 and again showing the parts in their positions at which the film carriers are lowered as shown in Figure 2;

Figure 6 is a fragmentary horizontal sectional view illustrating a portion of the film carrier indexing means in the positions assumed during indexing of the carrier;

Figure 7 is a fragmentary sectional view taken along line 7—7 of Figure 3 and illustrating the means for providing a positive cam action at one portion of the cycle;

Figure 8 is a fragmentary plan view taken from station 8—8 indicated in Figure 2, and illustrating the film carriers in the Figure 2 positions;

Figure 9 is an enlarged detail view taken from station 9—9 indicated in Figure 2, and illustrating the feed down means for delivering an exposed film strip from the camera to a film carrier after the latter has been swung to operative position;

Figure 10 is a section taken along line 10—10 of Figure 9;

Figure 11 is a fragmentary view showing the timer and carrier selector portions of the apparatus, looking upwardly from station 11—11 shown in Figure 1;

Figure 12 is a side elevation of the carrier selector and timer and as viewed from station 12—12 shown in Figure 11, the parts being illustrated (as in Figure 1) in the positions assumed between uses of the apparatus;

Figure 13 illustrates the carrier selector and timer as viewed from the rear of the showing of Figure 12, the parts bieng again shown in their inoperative or Figure 1 positions;

Figure 1:
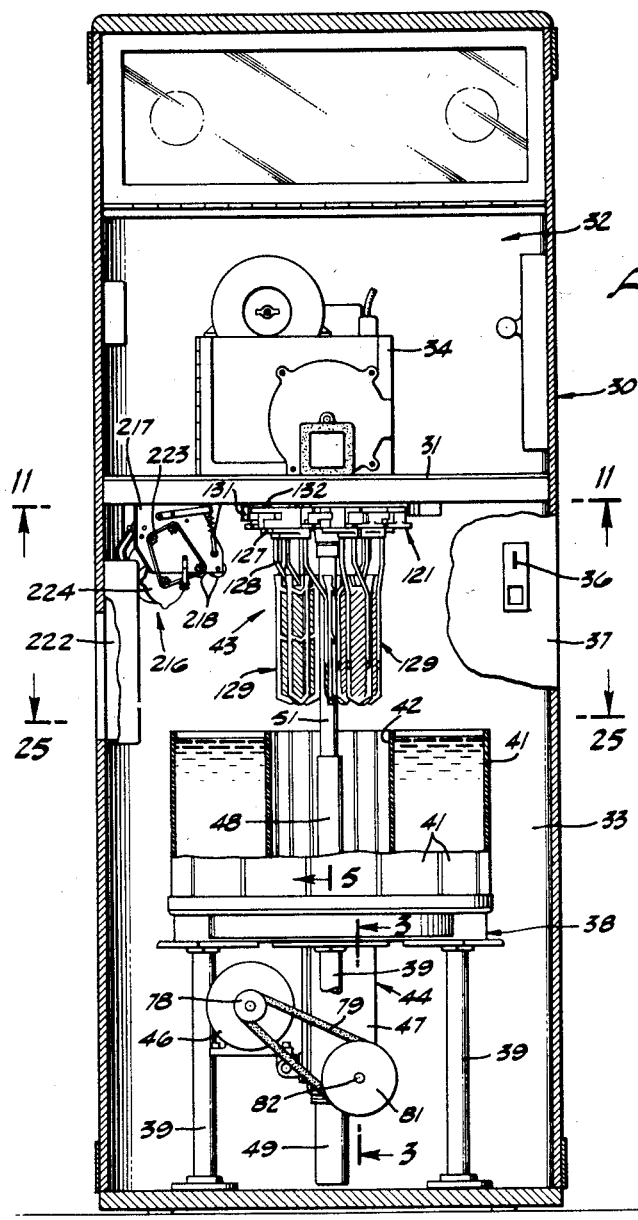
Figure 1 is a vertical sectional view taken through the developing and camera chambers of a booth or studio constructed in accordance with the present invention, the parts being shown in the positions assumed between developing operations and when no coin has been inserted.

Figure 14 corresponds to Figure 13 but illustrates the positions of the components after energization of the solenoid and lowering of the film carrier means;

Figure 15 is a fragmentary view also corresponding to Figure 13 but showing the positions of the parts during latching of the carrier selector pins;

Figure 16 is a fragmentary view corresponding to Figure 12 but showing the film carrier spider down and solenoid energized, so that the carrier selector pins are set to swing the carriers to operative positions;

Figure 17 is a transverse section taken along line 17—17 of Figure 12;

Figure 18 corresponds generally to a portion of Figure 8, but shows a film carrier in the process of being cam actuated from its inoperative inner position to its operative outer position;

Figure 19 corresponds to Figure 18 but shows the carrier being cam actuated from its outer to its inner position;

Figure 20 is a detail perspective view illustrating a film carrier with a film strip therein;

Figure 21 is a section along line 21—21 of Figure 20;

Figure 22 is an enlarged sectional view of the film delivery or discharge apparatus, shown in elevation at left center in Figure 1, for removing a developed film from the film carrier and conveying the same to a point of discharge to the operator.

Figure 26:
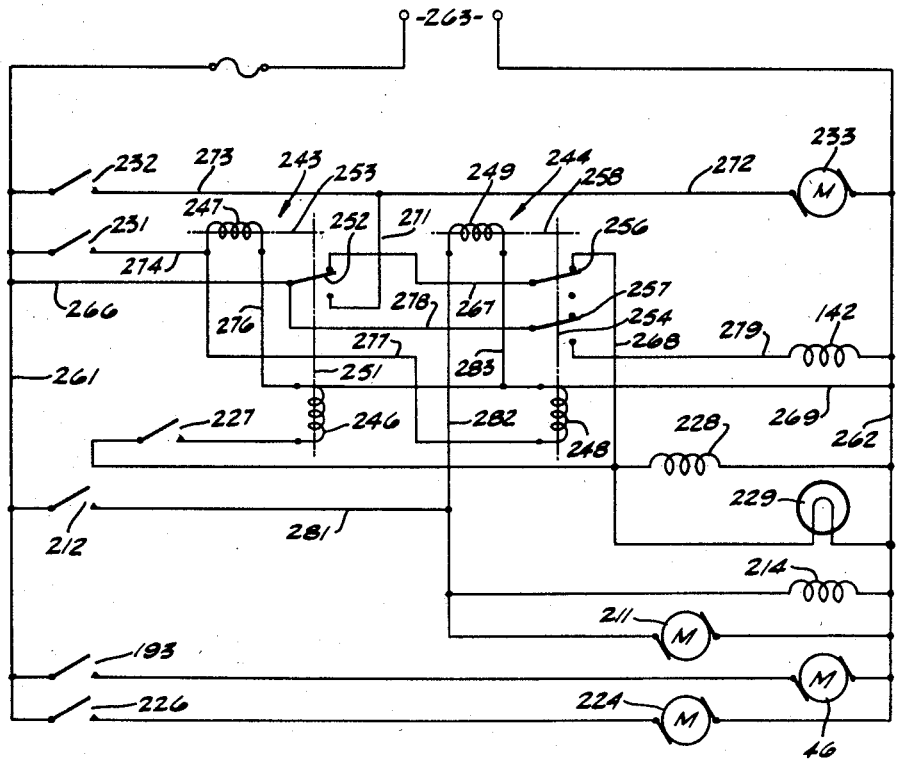
Figure 25:
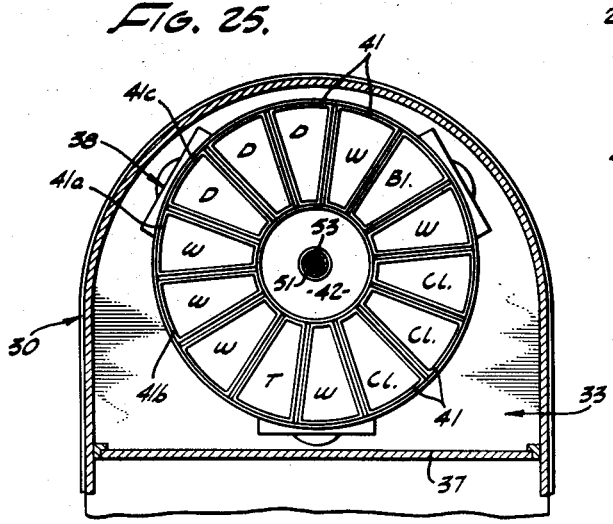

Figure 23 is a section along line 23—23 of Figure 22;

Figure 24 is a fragmentary view corresponding to a portion of Figure 22 but showing the spider and film carrier in the slightly lower position assumed during indexing thereof and after contact with the film delivery apparatus;

Figure 25 is a section along line 25—25 of Figure 1 and showing the arrangement of the developer and rinse tanks;

Figure 26 is a schematic wiring diagram of the apparatus; and

Figure 27:
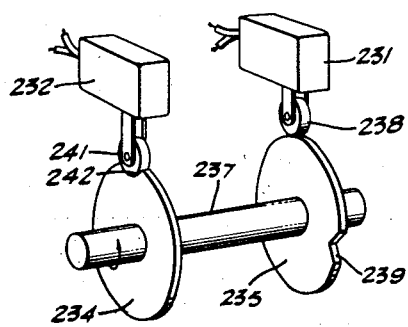

Figure 27 is a fragmentary view showing the camera operated cam switch means.

Figure 2:
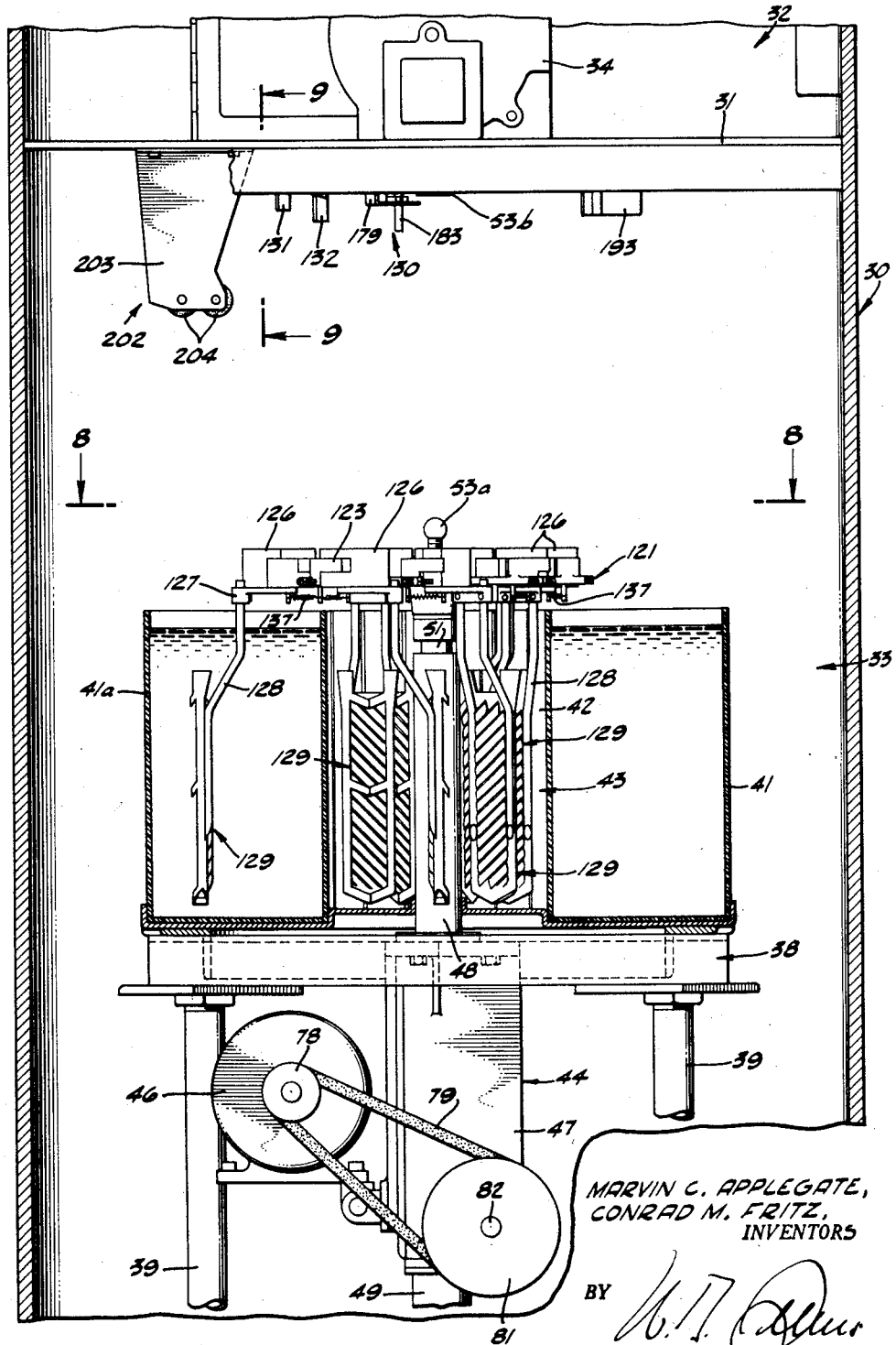
Figure 2 is an enlarged fragmentary view corresponding generally to Figure 1 but showing the parts in the positions assumed when one film carrier is in use and is immersed in a developer tank, but the other carriers are not in use and are not immersed.

Referring now to the drawings and particularly to Figures 1 and 2, the apparatus of the invention is shown as mounted in a cabinet or booth 30 provided with a horizontal shelf or support 31 and defining an upper camera chamber 32 and a lower developing chamber 33. Mounted in chamber 32 is a camera 34 adapted to take a series of pictures, preferably four, in sequence on a film strip and after depositing of a coin in a slot 36, the latter being shown as provided in the wall 37 separating the chambers 32 and 33 from the portion of the booth in which the customer sits and poses. Camera 34 may be of the construction shown and described in Patent 2,534,214 for a Camera Shutter and Film Actuating Mechanism, issued December 19, 1950, to Philip S. Allen, and also shown and described in modified form in co-pending application Serial No. 468,179, filed November 12, 1954, now abandoned, for Light and Camera System for Automatic Photographic Apparatus. This patent and patent application are referred to for the details of construction of the camera, and the latter will not be shown or described in detail herein.

Chamber 33 (and also chamber 32) is of a suitable light-tight construction and may be seen to contain a table 38 having legs 39 rigidly affixed to the floor of the booth 30. As best illustrated in Figure 25, the annular top of table 38 has mounted thereon in arcuately adjacent relationship a series of fourteen developer tanks 41 respectively containing the various solutions employed to develop and rinse the film strip. In the illustrated embodiment those tanks labeled "W" contain water, those labeled "D" contain developer, the one labeled "Bl" contains bleach, those labeled "Cl" contain clearing, and the one labeled "T" contains toner. It is emphasized that the inner walls of the various tanks 41 define an annular central chamber 42 which is very important in permitting successful operation of the present apparatus without special automatic means for supplying chemicals and water to the various tanks, and for preventing inter-tank pollution.

Referring again to Figures 1 and 2, film strip carrier means 43 are mounted in chamber 33 above the developing tanks 41, and are adapted to be both reciprocated and rotated to effect sequential dipping of the exposed film strips into the various tanks. To effect this vertical reciprocation and also rotation of the film strip carrier means 43, a drive or cam means 44 is mounted in dependent relation from table 38 and is powered by an electric motor indicated at 46. The operation of the drive means 44 will next be described in detail and with particular reference to Figures 3–7. The means 44 is also shown and described in greater detail in co-pending application Serial No. 468,180, filed November 12, 1954, for a Drive Unit Incorporating Backlash Eliminator Means, now Patent No. 2,852,945.

*The carrier drive means*

The drive or cam means are mounted in a suitable cast metal housing 47 having upper and lower bearing sleeves 48 and 49 suitably secured thereto in axial alignment with each other and with the axis of chamber 42. As shown in Figure 5, the lower bearing sleeve 49 extends for a substantial distance beneath housing 47 and also for a substantial distance interiorly thereof. The upper bearing sleeve 48 terminates adjacent the upper portions of the developer tanks 41 as shown in Figures 1 and 2. A rack sleeve 51 is mounted within the lower bearing sleeve 49 by means to be described hereinafter, and within upper bearing sleeve 48 by means of a bushing 52 permitting free sliding vertical movement. The rack sleeve 51 extends upwardly to the film strip carrier means 43, as best illustrated in Figure 17, and seats on the bottom of the latter in such a way that relative rotational movement is permitted. Mounted axially of rack sleeve 51 is a rotation rod 53 having a reduced upper end portion 54 (Figure 17) which is non-rotatably secured by means of a nut 56 and pin 57 to the film strip carrier means 43. The rotation rod 53 extends for the full length of the rack sleeve and rotates in bushings 58 in the latter.

The lower bearing sleeve 49 is provided with a pair of bushings 59 to rotatably receive a key sleeve 61 best shown in Figure 5. A gear 62 is mounted horizontally around the upper and exposed part of key sleeve 61, generally at the center of housing 47, and is provided with a sleeve portion 63 which seats rotatably on the upper end of a bushing 59 and is locked to the key sleeve by means of a set screw 64. Mounted longitudinally within key sleeve 61 by means of screws 66 is a key 67 of rectangular section and which extends for substantially the full length of the key sleeve as illustrated. At the upper end of the key sleeve, and diametrically opposite key 67, is mounted a ball 68. The ball 68 is disposed within a precision bushing 69 extending through an aperture in the key sleeve, the bushing being so related to the ball that the latter may move radially of the key sleeve but is maintained against movement circumferentially or longtiudinally thereof. A leaf spring 71 is mounted exteriorly of the key sleeve 61 and adapted to press ball 68 radially inwardly.

The lower end of rotation rod 53 is reduced in diameter and inserted into a plug 72 as shown in Figure 5, there being a pin 73 provided to hold the plug in position and prevent rotation thereof relative to the rod 53. One side of plug 72 is formed with a keyway 74 of rectangular section and which is adapted to fit loosely over the rectangular key 67 indicated above. Diametrically opposite the keyway 74 is a second keyway 76, this keyway being of V-section instead of rectangular section. The plug 72 seats against the lower end of rack sleeve 51 and in such a way that the plug may rotate relative to the sleeve 51.

The gear 62 is provided with fourteen teeth 77 as indicated in Figure 6, corresponding to the number of devolping tanks 41 as shown in Figure 25. It follows that each time the gear 62 is shifted $\frac{1}{14}$ of a revolution, due to the shifting of one tooth 77 into the position previously occupied by the adjacent tooth and as will be described subsequently, the film strip carrier means 43 will be rotated or indexed so that each of its film carrier components is shifted from above one tank 41 to above the adjacent tank 41. The connection between gear 62 and the film strip carrier means 43 is effected first by the set screw 64 which rotates the key sleeve 61 with the gear, and then by the key 67 which serves to rotate the plug 72 with the key sleeve. Since plug 72 is pinned by the pin 73 to rotation rod 53, the rotation of the plug effects rotation of rod 53 and thus of the film strip carrier means 43, the latter being non-rotatably secured to the upper end of the rotation rod as previously described.

The described rotational movements take place without effecting rotation of rack sleeve 51, this element being held against rotation due to meshing of its teeth with the associated pinion. However, the vertical movement of the rack sleeve 51 operates either to lift the film strip carrier means 43 or effect lowering thereof since the ends of the rack sleeve bear respectively against the film strip carrier means and the plug 72.

It is a feature of the invention that the upward and downward movement of the rack sleeve 51 and plug 72 is for the most part relatively frictionless since the keyway 74 is only a loose fit over key 67. This loose fit means that the film strip carriers are not perfectly centered in their various indexed positions as they move vertically during the major portion of a stroke. However, as soon as the plug 72 arrives at an upper point adjacent ball 68, when the rack sleeve 51 is near the upper end of its stroke, ball 68 rides into the V-shaped keyway 76 to effect perfect centering of the plug 72 and thus of rotation rod 53 and the film strip carrier means. Any backlash or play between the film strip carrier means and the drive therefor is thus eliminated when the film strip carrier means is in the elevated position at which it makes contact with various film conveyor mechanisms to be described hereinafter, yet this absence of play does not result in excessive friction during the major portion of the vertical movement of the described elements. As a further important means for reducing friction while providing perfect centering, a sphere 53a is provided at the upper end of rod 53 for insertion into a precision socket 53b (Figure 17) on shelf 31 when carrier means 43 is in its two upper positions. This construction permits the bearings for rack sleeve 51 to be relatively loose and frictionless without impairing the centering of the carrier.

Figure 3:
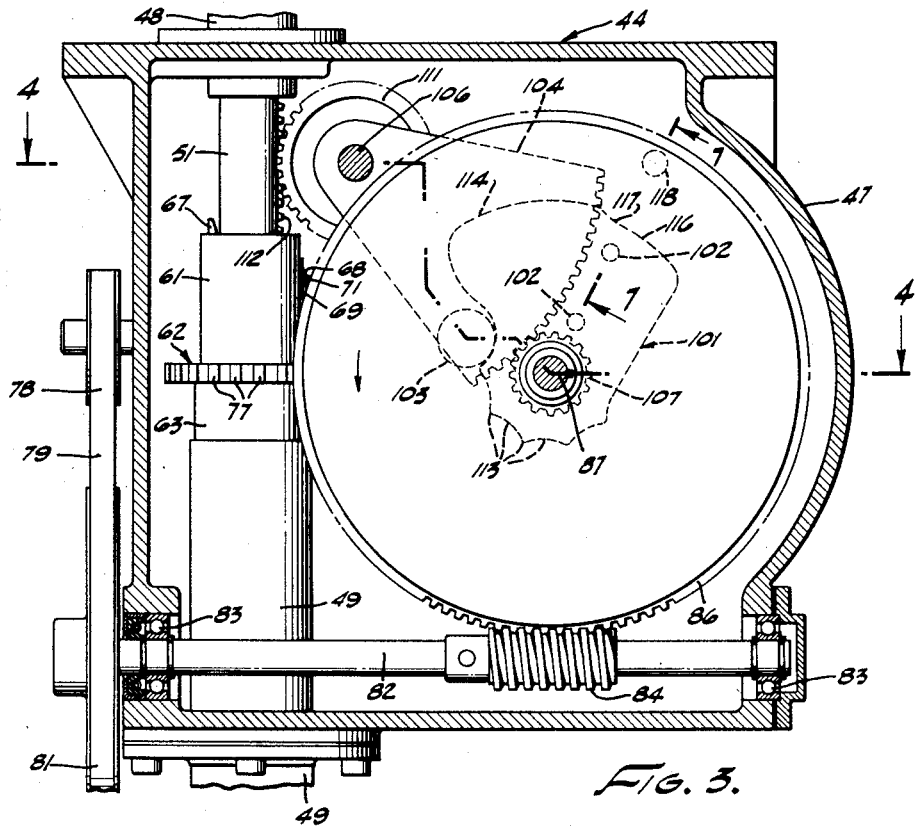
Figure 3 is an enlarged vertical sectional view taken along line 3—3 of Figure 1 and illustrating the drive or transmission portions of the apparatus, the parts being shown in the positions assumed when the film carriers are lowered as shown in Figure 2.

Proceeding next to a description of the means which cooperate with rack sleeve 51 to effect its vertical movement and with gear 62 to effect its intermittent rotational movement, the shaft of motor 46 (Figures 1 and 2) is provided with a pulley 78 connected through a belt 79 to a pulley 81 on a shaft 82 which is journalled in the walls of housing 47 by means of ball-bearings 83 best shown in Figure 3. A worm 84 is non-rotatably mounted on shaft 82 and adapted to drive a relatively large diameter gear 86 which is keyed to a shaft 87, the latter being journalled in the walls of housing 47 by means of the ball-bearings 88 illustrated in Figure 4. Shaft 87 is thus rotated by the motor and serves the function of driving an intermittent drive disc 89, the latter being keyed to the other end of shaft 87 from gear 86 as illustrated. Disc 89 is formed with a precision bevel edge 91 which fits closely between two adjacent teeth 77 of gear 62 and effectively prevents any rotation of the gear 62 during the major portion of a drive disc revolution.

A rectangular notch or window 92 is formed at one point in the periphery of disc 89 as best shown in Figure 5, and an actuator 93 is secured to the disc adjacent window 92 and by means of screws 94. The actuator 93 is recessed into disc 89 and is provided with a slanted cam wall 96 which is so shaped that it will push one tooth 77 of gear 62 through the window 92 as the disc rotates. As soon as this tooth 77 has been pushed through the window, the unnotched periphery or bevel edge 91 of disc 89 will again operate to lock gear 62 against rotation.

In the described manner, therefore, gear 62 and thus film strip carrier means 43 are locked against any rotational movement except when the window 92 and actuator 93 rotate past the gear 62, at which time the gear is indexed $\frac{1}{14}$ of a revolution as is the film strip carried means. The described intermittent drive and locking arrangement cooperate with the previously described ball 68 and V-slot 76 to prevent any backlash or play between the drive and the film strip carrier means 43, so that the latter are accurately located in each indexed position and there is no possibility of fouling between the film strip carrier means and the film conveyor or other mechanisms which form part of the apparatus. For a more complete description of the actuator 93 and of its mounting and positioning relative to disc 89, reference is made to the co-pending application Serial No. 468,180, cited above.

Figure 4:
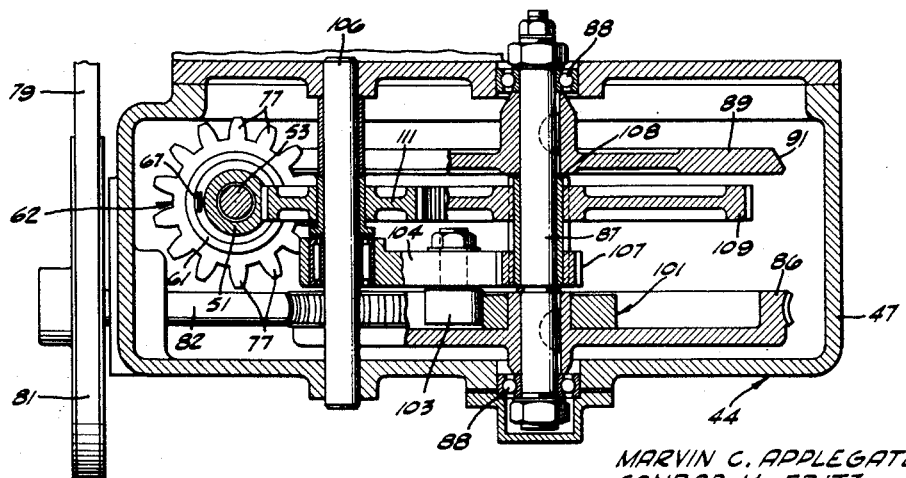
Figure 4 is a horizontal section taken along the broken line 4—4 of Figure 3.

Referring to Figures 4 and 7, one wall of gear 86 is recessed or dished to receive a cam 101, the latter being secured to the gear as by screws 102. Cam 101 engages a cam follower roller 103 mounted on a sector gear 104 which has its apex mounted for free rotational movement about a fixed shaft 106 extending parallel to shaft 87 relatively adjacent the exposed part of rack sleeve 51. The arcuate edge of sector 104, remote from shaft 106, meshes with a relatively small gear 107 which is keyed on a sleeve 108 adapted to rotate freely relative to its supporting shaft 87. Also keyed on sleeve 108 is a relatively large gear 109 meshing wtih a pinion 111 which is supported on the fixed shaft 106 for free rotation relative thereto. The teeth of pinion 111 mesh with rack teeth 112 on the lower portion of rack sleeve 51, so that rotation of the pinion will effect vertical reciprocation of the rack sleeve and thus of the film carrier means.

From the above it will be seen that rotation of worm 84 by motor 46 effects rotation of gear 86 and thus of cam 101 secured thereto. Cam follower roller 103 is thus shifted in accordance with the shape of the cam to effect pivoting of sector 104 about shaft 106. The small gear 107 meshed with sector 104 is thus driven to rotate sleeve 108 about the shaft 87 on which it is supported, so that large gear 109 is also rotated to drive pinion 111 and thus effect vertical movement of rack sleeve 51 and the film strip carrier means 43 associated therewith. The direction of motor rotation is such that shaft 87, and thus cam 101 and intermittent drive disc 89 rotate counterclockwise as viewed in Figures 3 and 5. Furthermore, the elements are so related that when cam follower roller 103 engages a low point on cam 101 the rack sleeve 51 and thus film carrier means 43 will be in a low position such as is shown in Figures 2 and 5. When, however, the roller is at a high point on cam 101 the rack sleeve and film carrier will be in an upper position such as is shown in Figure 1.

Referring to Figure 3, the cam 101 is shaped with a series of rises and depressions 113 relatively adjacent shaft 87, and which effect upward and downward movement of the film carriers when immersed in tanks 41 so that agitation of the various developing fluids will take place. The highest section of the cam is indicated at 114 and is the one effecting positioning of film strip carrier means 43 in its uppermost position in engagement with various film strip conveyor means to be described subsequently. A second high section of cam 101, but slightly lower than section 114, is indicated at 116 and is separated from section 114 by a drop portion 117. The section 116 is the one effecting positioning of the film carrier means at an elevation slightly below its uppermost position, the drop at portion 117 being sufficient to permit the film carrier means to clear the various conveyor mechanisms during indexing. The position of cam 101 relative to actuator 93 and window 92 is such that rotation or indexing of gear 62, and thus of the film strip carrier, takes place only when roller 103 is on the cam section or arc 116 and the film carrier is clear of the various conveyor mechanisms and also of the tanks.

When the cam follower roller 103 rides off cam section 114 and down the drop 117 to portion 116, the rack sleeve 51 must drop immediately in order to effect the necessary lowering of film strip carrier means 43. If this dropping action is not positive and immediate, the gear 62 and film strip carrier means 43 will index and the latter will engage and foul with the various film conveyor means and cause damage to or breaking of the apparatus. Accordingly, and as shown in Figures 3 and 7, a pin 118 is mounted at the periphery of gear 86 opposite cam section 116 adjacent drop portion 117 and is spaced radially away from section 116 by a distance approximately equal to the diameter of roller 103. It follows that a local positive cam action is provided between the pin 118 and the roller 103 to insure that the latter immediately engages cam section 116 as it rides off drop portion 117, so that dropping of the rack sleeve 51 and film strip carrier means is positive and immediate as is desired and necessary.

*The film strip carrier means*

Proceeding next to a detailed description of the film strip carrier means 43, and referring particularly to Figures 8 and 17–24, these means comprise a horizontally disposed spider 121 having seven equally spaced radially extending corresponding arms 122. The outer end of each arm 122 is provided with an enlarged laterally extending lug portion 123 serving to receive the vertical pivot pin 124 on which a pivotable cam member 126 is mounted. The underside of each cam member 126 is rigidly associated with a plate 127 serving to support two downwardly extending rods 128 on which a depending film carrier 129 is secured as shown in Figures 20 and 21. The cam member 126, plate 127, rods 128 and film carrier 129 rotate together about pivot pin 124 upon engagement of the cam member 126 with one of a pair of vertically movable carrier selector pins 131 and 132 forming part of the carrier selector and timer mechanism 130 to be described subsequently in connection with Figures 11–16. The film carrier 129 is shaped as a vertical channel or receptacle to receive in vertically disposed relationship a film strip 133 fed thereto from camera 34, and preferably having four exposures thereon. Film carrier 129 is of a special vaned type a counterpart of which is described in detail in Patent No. 2,541,016 issued February 13, 1951, to Philip S. Allen. The vanes on the carrier effect agitation of the developing fluid during vertical reciprocation of the carrier by the drive means described heretofore, so that an extremely fast and effective developing action takes place.

In the specific construction of the cam member 126 on each spider arm 122, and as related to the carrier selector or cam actuating pins 131 and 132, a curved vertical cam surface 134 is formed on the cam 126 and shaped so that clockwise movement of the spider, as viewed in Figures 8, 18 and 19, will create a cam action between pin 131 and surface 134 such that the cam is rotated counterclockwise about pivot 124 and from its outer to its inner position. In addition, a straight vertical cam surface 136 is formed on each cam member 126 and is so shaped that the clockwise spider movement will create a cam action between pin 132 and cam surface 136 and effect clockwise pivoting of the cam member about pivot pin 124 and from its inner to its outer position. An overcenter tension spring 137 is connected between each cam member 126 and lug portion 123 at points such that cam member 126 and the carrier attached thereto will always move to the extreme outer position or the extreme inner position and will never stop at an intermediate point. This inner position is determined by an adjustable stop screw 138 on each spider arm 122, whereas the outer position is determined by an adjustable stop screw 139 on a lug at the outer end of the spider arm.

It is emphasized that when the cam 126 of a film carrier assembly is in engagement with stop screw 138, the film carrier 129 will be in the inner position shown in Figures 1, 2 and 8 and will therefore be directly above or in the central chamber 42 formed between the various developer tanks 41. It follows that vertical reciprocation of the film strip carrier means 43 when a carrier is in this inner position will cause movement thereof into and out of the central chamber 42 and will not result in its immersion into the developer and rinse solutions. However, when the curved cam surface 134 of a carrier assembly is in engagement with the outer stop screw 139, so that the carrier 129 is in the outer position shown at the left in Figures 2 and 8, the carrier 129 will be directly above or in the center of the tank 41 and vertical reciprocation at that time will result in its immersion into or withdrawal from the solutions.

When the carrier selector pin 132 is in its lower position, and the film carrier 129 passing adjacent the pin 132 happens to be in its inner position, a cam action (Figure 18) will be created between pin 132 and cam surface 136 which will effect rotation of the carrier 129 to its outer position. The pin 131 is then in an upper or elevated position so as to provide no interference with the cam 126. Conversely, when the pin 131 is in its lower position and the pin 132 is elevated, and the carrier 129 passing past the pin 131 happens to be in its outer position, a cam action will be provided (Figure 19) which will cause inward pivoting of the carrier 129 to its inner position. Such inward and outward pivoting of the film carriers 129 occurs when the film strip carrier means are in an elevated position such as is shown in Figure 24, it being remembered that rotation of the carrier spider 121 only occurs when the cam follower roller 103 (Figure 3) is on section 116 of the cam 101 as previously described in detail.

The carrier selector and timing means

There will next be described the very important carrier selector and timing mechanism 130 for vertically moving the cam actuating pins 131 and 132, and for timing the operation of the apparatus. The means 130 is so constructed that when a picture strip 133 has been exposed by the camera 34 and requires development a film carrier 129 is swung from inner to outer position. When, on the other hand, the film or picture strip has been completely developed and discharged from the apparatus, the carrier is swung from outer to inner position. The mechanism is therefore such that a carrier 129 will never be in the outer position, and thus immersed in the tanks 41 as shown at the left in Figure 2, unless such a carrier position is necessary to effect development of an exposed film strip.

The indicated carrier selector action by which a carrier is never immersed in developing or rinse fluid unless necessary to develop a film strip is extremely important in preventing dilution, contamination and waste of the various developing solutions contained within tanks 41. Stated otherwise, this inner and outer swinging of the carriers 129, depending upon whether or not they are needed, is what makes practical the use of the apparatus for a substantial length of time without attendance and without the necessity of providing expensive and automatic chemical refill tanks. It will be understood that if all film carriers 129 were always in the outer position, all seven carriers would be dipped in successive tanks 41 in spite of the fact that in many instances only one or two carriers 129 are actually needed. Since each time a carrier 129 is lifted from one tank and lowered into the adjacent one the liquid clinging to the carrier surface tends to effect contamination of the fluid in the adjacent tank, it will be appreciated that the amount of contamination effected by all the carriers 129 operating at all times, whether needed or not, would be very substantial indeed.

The mechanism 130 is illustrated best in Figures 11–17, and may be seen to comprise a supporting bracket or plate 141 which is suitably secured in vertical relationship on the underside of shelf 31 of the apparatus. Mounted on one side of the bracket 141, and at the end thereof remote from carrier selector pins 131 and 132, is a solenoid 142 having its plunger 143 connected to a slide plate 144 as best shown in Figures 13 and 14. A second slide plate 146 is provided in general axial alignment with slide plate 144 and is normally held in endwise abutment therewith by means of a tension spring 147 connected between suitable pins on the respective plates. Both the slide plates are provided with horizontal slots 148 which receive screws 149 extending into bracket 141, and which permit limited horizontal displacement of both plates 144 and 146 depending upon whether or not the solenoid 142 is energized. A tension spring 151 is connected between a pin on bracket 141 and a pin on slide 144 as best shown in Figures 11 and 12 and serves the purpose of biasing the slides to the left as viewed in those figures so that the solenoid plunger 143 will be in its outer position unless shifted to its inner position due to solenoid energization.

A laterally extending pin 152 is mounted at the end of the second slide plate 146 remote from solenoid 142, and extends through a slot 153 in bracket 141. The free end of pin 152 is disposed in a U-shaped slot in the stem of an inverted T member 154, the latter being pivoted to bracket 141 by means of pin 156. The ends of the arms of T member 154 are pivotally connected to pins 131 and 132, as are the ends of a guide lever 157 which is pivoted to bracket 141 by means of a pin 158. With the described construction it will be seen that longitudinal shifting of slide member 146 due to energization or deenergization of the solenoid 142 will effect pivoting of the T member 154 about pin 156, thereby elevating or lowering the pins 131 and 132 relative to each other. Because of the fact that the spring 151 normally maintains the slides 144 and 146 in their right position as viewed in Figure 13, pin 131 is normally down and pin 132 is up. Since pin 131 is the one which, when lowered, effects inward swinging of the film carriers 129 as described in connection with Figure 19, it will be seen that the carrier selector pins are normally in the positions effecting actuation of the film carriers from their outer to their inner positions.

Instead of employing two separate pins 131 and 132, a single pin or other means could be employed. For example, the single pin could be rotated about a horizontal axis toward or away from solenoid 142, depending on whether or not the latter is energized and whether it is desired to swing the carriers inwardly or outwardly.

In addition to the above described solenoid and slide means for operating the pins 131 and 132, the means 130 includes a pawl and ratchet mechanism best shown in Figures 11, 12, 16 and 17, and which comprises a ratchet wheel 161 which is freely rotatable about a stub shaft 162 projecting from bracket 141. A torsion spring 163 is mounted around stub shaft 162 and connected to a pin 164 on the ratchet wheel, the direction of winding of the spring being such that the ratchet wheel is constantly urged in a counterclockwise direction as viewed in Figures 12 and 16. A pin 166 on ratchet wheel 161 is adapted to engage a stop pin 167 on bracket 141 in order to limit such counterclockwise ratchet rotation and stop the wheel in the position shown in Figure 16.

Cooperating with ratchet wheel 161 are a holding pawl 169 and an actuating pawl 170. Holding pawl 169 is pivoted at its base to a stub shaft 171 on bracket 141, and is provided adjacent the stub shaft with a pin 172 which extends beneath bracket 141 and is connected by a tension spring 173 to a pin on the bracket. The tension spring 173 and pin 172 serve the function of effecting clockwise bias of the holding pawl 169 as viewed in Figures 12 and 16, and the pin 172 also serves the function of cooperating with a hook member 174 to effect release of the holding pawl. Hook member 174 extends in sliding contact with the lower edge of bracket 141 and is suitably connected to the slide 144, the latter being directly actuated by solenoid plunger 143 as previously described. It is thus seen that the holding pawl is normally held in holding position by the spring 173 but is released upon energization of solenoid 141 to pull the hook member 174 into contact with pin 172 and thus pivot the holding pawl counterclockwise and release the ratchet wheel.

Actuating pawl 170 comprises a base member 176 which is pivoted at one of its ends to the stub shaft 171 and is provided at the other of its ends with a pivotally mounted pawl tooth 177 adapted to engage the teeth of ratchet wheel 161. Tooth 177, and the entire actuating pawl, are urged to clockwise rotated position by means of a tension spring 178 connected to one of the horizontally extending arms of a U-shaped bracket 179, the latter being supported on a pin 181 which depends from shelf 31. A stop pin 182 is provided on pawl base 176 for the purpose of preventing excessive clockwise movement of tooth 177.

The means for driving the actuating pawl 170 comprises a vertical drive pin 183 reciprocably mounted in the arms of U-shaped bracket 179 and having a central rectangularly shaped collar 184 secured thereon by means of a set screw. Welded to collar 184 and extending inwardly therefrom is a horizontal pin 186 (Figures 11 and 17) adapted to engage the underside of pawl base 176, the inner end of the pin 186 being vertically slidable in a guide 187 secured to bracket 141. Drive pin 183 is adapted to be engaged and actuated by spider 121 as the latter moves to its uppermost position, and once during every second or alternate index thereof. To prevent actuation of drive pin 183 during the remaining alternate indexes of the spider 121, a plurality of holes 188 are provided in the spider in arcuately spaced relationship as best shown in Figure 8.

In the operation of the timing and carrier selector mechanism 130 as thus far described, let it be assumed that the parts have been shifted to the positions shown in Figure 16. That figure illustrates the positions assumed when the spider 121 is below and remote from the mechanism 130, and after the solenoid 142 has been energized (when the spider 121 was in its uppermost position) to shift slides 144 and 146 to the right as viewed in Figure 16. Hook 174 has therefore engaged pin 172 to release holding pawl 169, and ratchet 161 has spun counterclockwise until pin 166 engages stop pin 167 as illustrated. Furthermore, the shifting of slide 146 has caused T-member 154 to rock and effect lowering of pin 132 and raising of pin 131.

As will be described in detail subsequently, the solenoid 142 is later de-energized, so that pins 131 and 132 assume their original or normal positions with pin 131 lowered and pin 132 elevated. De-energization of solenoid 142 also causes hook 174 to shift away from pawl pin 172 and permit holding pawl 169 to snap against ratchet wheel 161. Upon the next movement of the spider 121 to its extreme upper position, when a hole 188 in the spider is not registered with drive pin 183, that pin will be engaged by the spider and elevated to the position shown in Figure 12. The actuating pawl is then also shifted upwardly due to engagement of horizontal pin 186 with the underside of pawl base 176, and the pawl tooth 177 engages a tooth on ratchet wheel 161 to rotate the latter clockwise one step. The ratchet wheel is thus rotated clockwise one step after every alternate index of the spider 121, or each time a hole 188 is not registered with the drive pin. The number of teeth on ratchet wheel 161 is selected so that sixteen indexes of the spider 121 will be required before ratchet 161 is rotated clockwise from the Figure 16 position to the Figure 12 position, the latter being the one assumed by the mechanism between uses and when no coin has been inserted into the apparatus.

As the ratchet wheel 171 rotates during its last step, following the sixteenth index of spider 121, the pin 164 engages (Figure 12) the upper side of the left end of a lever 189 which is pivoted at 191 on bracket 141 and urged in clockwise direction by a tension spring 192. The end of lever 189 remote from the ratchet wheel is adapted to engage the arm of a switch 193 which controls the operation of the main drive motor 46 of the apparatus. During the entire period of the operation of the apparatus, when the pin 164 is out of engagement with lever 189, the lever holds switch 193 in closed position to effect motor operation. However, the final clockwise rotation of ratchet wheel 161 to engage pin 164 with the lever effects counterclockwise pivoting of lever 189 and consequent opening of switch 193 to stop the motor.

If at any time during the described timing operation the solenoid 142 is re-energized, the hook 174 will engage pawl pin 172 and effect disengagement of holding pawl 169 from the ratchet wheel, so that the latter will spin back to its original position, shown in Figure 16, and the timing cycle will start over. As will be described hereinafter, the solenoid 142 is re-energized due to dropping of a coin in coin slot 36 and consequent taking of additional pictures by camera 34. The restarting of the cycle will therefore effect complete development of the last picture taken by the apparatus and regardless of the number of coins dropped in slot 36 or the number of pictures taken.

Should a coin be dropped in the coin slot at such a time, during the described cycle of timing operation, as to effect re-energization of solenoid 142 when the spider 121 happens to be in its extreme upper position, shown in Figures 12 and 13, the resulting solenoid plunger movement will operate through slide 144 and spring 147 to shift slide 146 from the position shown in Figure 13 to that shown in Figure 14. This will result in re-lowering of pin 132 and raising of pin 131, so that the next retracted carrier 129 which passes past the lowered pin 132 will be swung outwardly to above a developer tank 41 due to the cam operation illustrated in Figure 18, and described previously. However, if the spider 121 does not happen to be in its extreme upper position when the solenoid 142 is re-energized, a horizontal latch pin 196 extending through an aperture 197 in bracket 141 will, as shown in Figure 15, engage a stop pin 198 on slide 146 and prevent shifting of the latter with slide 144 as the solenoid is energized. The spring 147 will, however, tension so that upon elevation of latch pin 196 away from stop pin 198 the slide 146 will be shifted due to the energy stored in spring 147, and the pins 131 and 132 will shift positions at that time.

Latch pin 196 is mounted at the end of a lever 199 which is pivoted on stub shaft 162 and held in counterclockwise rotated position by a tension spring 201 shown in Figures 12 and 16. A disc on the end of lever 199 adjacent latch pin 196 is adapted to be engaged and actuated upwardly by the upper edge of pawl base 176 when the latter is raised due to engagement of drive pin 183 by the upwardly moving spider 121. It follows that the pin 196 will be in its latching position, in engagement with stop 198 and preventing shifting of slide 146, at all times except when spider 121, pin 183 and thus pawl base 176 are shifted upwardly to pivot lever 199 clockwise, as viewed in Figures 12 and 16, and thus lift pin 196 out of the way of stop 198.

The described operation of latch pin 196 is very important in preventing fouling of the carrier selector pins 131 and 132 with the film strip carrier means 43. It will be remembered that indexing of the spider 121 and film carrier members thereon does not occur when the spider is in its extreme upper position, at which pin 183 is engaged and actuated, but instead when the spider is in a slightly lower position out of engagement with drive pin 183. When this indexing occurs, the lower one of pins 131 and 132 will engage the associated vertical cam surface of cam member 126 and thus effect inward or outward pivoting of a film strip carrier 129. It will be understood that should the pins 131 and 132 be shifted at the exact moment when a carrier cam 126 is passing therebeneath, one of the pins would engage the upper surface of the carrier cam and this would result in fouling and possible breakage of the apparatus. The latch pin 196 prevents this undesirable action by insuring that the carrier selector pins 131 and 132 cannot be shifted in position except when no indexing of the spider is occurring, and no cam 126 is disposed therebeneath. Accordingly, the pins 131 and 132 will always engage the cam surfaces 134 and 136 at the sides of the cams 126, as desired, instead of fouling with the upper surfaces of these members.

The described arrangement by which the ratchet wheel 161 and latch pin 196 are driven directly by the film strip carrier means 43, and more specifically by the spider 121, is extremely important to the successful and economical construction and operation of the present apparatus. This is because such direct driving insures that the timing ratchet will always be perfectly correlated with the spider position, which is essential to the proper operation of pins 131 and 132 and to the proper timing of a cycle. Furthermore, the direct drive for these elements is much more economical and easy to adjust than would be an arrangement in which the drive were through separate gear and shaft means from the main electric motor 46, for example.

*The film feed down unit*

There will next be described the conveyor mechanism 202, hereinafter referred to as the feed down unit, which delivers the exposed film strip 133 from the camera 34 to a film carrier 129. This mechanism is illustrated in Figures 2, 9 and 10 and is seen to comprise a bracket or housing 203 mounted on the underside of shelf 31 and having power driven feed rolls 204 journalled at the lower end thereof. The film strip is fed through an opening 206 in shelf 31 to a reception chamber defined by inclined walls 207 and 208, these walls being so slanted as to insure that the lower end of the film strip will be introduced between the feed rolls 204. The feed rolls are driven, in order to feed the film strip into a carrier, by means of a gear train 209 (Figure 9) and electric motor 211 the operation of which is controlled by a switch 212 (Figure 11) which is engaged and closed by the upper horizontal wall of a carrier cam member 126 when the latter is in its extreme upper position.

As best shown in Figure 8, the feed rolls 204 of feed down mechanism 202 ar disposed to the rear of the carrier selector pins 131 and 132, that is to say on the side of the carrier selector pins such that operation of the latter will have a relatively immediate effect in determining whether or not there will be a carrier 129 beneath rolls 204. The spider 121, in rotating clockwise as viewed in Figure 8, will accordingly effect engagement of pin 132 (when lowered) with cam surface 136 of the next succeeding carrier assembly, and consequent pivoting of a carrier 129 to the outer position beneath the rolls 204. After a carrier 129 has thus been swung to beneath the rolls 204, it is elevated to the upper position shown in Figures 9 and 10, so that the upper or mouth end of the carrier is positioned over a depending feed portion 213 of the feed down mechanism. It is thus insured that operation of rolls 204 will effect accurate feeding of the film strip 133 into carrier 129 without any possibility of binding or buckling. It is pointed out that the backlash elimination means 68 and 89, described in connection with Figures 3-7, are what insure that the mouth of the carrier 129 will always be centered at the position necessary for movement over the depending feed portion 213.

The described closing of switch 212 by a carrier cam 126, when the film strip carrier means is shifted to its upper position, not only effects energization of motor 211 to drive the feed down rolls 204, but also effects cutting off the film strip 133 by means of a solenoid operated knife, not shown, which forms part of camera 34 and is described in Patent 2,534,214, previously cited. Switch 212 also performs certain other functions in the operation of the apparatus and as will be described subsequently in connection with the wiring diagram shown in Figure 26. The solenoid which operates the cut off knife is shown at 214 in Figure 26, and has the reference numeral 114 in the patent referred to.

*The film discharge or delivery unit*

The conveyor mechanism for withdrawing the developed film strip 133 from a film carrier 129, and conveying the same to a discharge chute, is referred to as the delivery unit and has been given the reference numeral 216. This mechanism is shown in Figures 1 and 22–24, and comprises a supporting bracket or housing 217 mounted on the underside of shelf 31. Bracket 217 serves to support two pairs of relatively narrow conveyor rolls 218, and a pair of relatively wide drying rolls 219, the axes of the rolls being arranged in arcuately spaced relationship. Arcuate guide members 221 are suitably supported on the bracket 217 to guide the film strip 133 from carrier 129 to a discharge chute 222 opening to the exterior of the apparatus. The various conveyor rolls 218 and the drying rolls 219 are driven through a chain 223 by an electric motor 224, so that operation of the motor effects withdrawal of the film strip from the carrier 129 and its delivery to the chute 222.

The motor 224 is controlled by a switch 226 on the underside of shelf 31 and which is adapted to be engaged by a cam 126 when the film strip carrier means are in their extreme upper position. The carrier 129, which is suitably notched as indicated, then fits around the lowermost conveyor rolls 218 so that the latter have an effective and sure grip on the film strip 133 and there can be no possibility of faulty operation.

Referring to Figure 8, it is pointed out that the delivery unit 216 (having conveyor rolls 218) is located in advance of the carrier selector pins 131 and 132 and also in advance of the feed down unit 202 having rolls 204. It follows that when a film carrier 129 is in its outer position and contains a fully developed film strip 133, the film strip will be withdrawn by the rolls 218 before the cam portion of the carrier engages pin 131 and is pivoted inwardly upon the next indexing of the film strip carrier means 43.

The exact manner of actuation of switch 226 (and, correspondingly, of switch 212) by the upper surface of a carrier cam member 126 is best shown in Figures 22 and 24. As shown in Figure 22, the switch is closed when the cam member 126 is in the uppermost position, but is open when the cam member is in the slightly lower position assumed during indexing of the spider. As previously stated, this uppermost position (Figure 22) takes place when cam follower roller 103 (Figure 3) is riding along the cam section 114, and the slightly lower position of Figure 24 occurs when the cam follower roller is on cam section 116. It is only when roller 103 is on portion 116 that actuator 93 (Figure 6) engages a tooth 77 of gear 62 to effect indexing of the film strip carrier means.

*Components of the electric circuit*

Referring next to the wiring diagram shown in Figure 26, there will first be described those electrical elements which have not been indicated heretofore during the description of structural portions of the apparatus. The indicated switch 227 is a conventional coin operated switch which is closed momentarily when the customer places a coin in slot 36 to start the operation of the apparatus. The coil 228 is a conventional coin return solenoid which, when de-energized, permits movement of a plunger, not shown, to a position preventing a coin dropped in slot 36 from having any effect on the operation of the apparatus, the coin being instead returned to the customer through a coin return chute. The light indicated at 229 is a warning light disposed near the coin slot and adapted, when energized, to illuminate a panel instructing the customer that the machine is ready to receive a second coin and start a new cycle of operation.

Switch 231 is the switch which is operated from the camera 34 to effect commencement of developer operation, while switch 232 is also operated from the camera 34 and serves to effect de-energization of the camera motor indicated at 233. As illustrated in Figure 27, the switches 232 and 231 are respectively operated by cams 234 and 235 on a shaft 237. Shaft 237 corresponds to the shaft 92 described in detail (together with the camera motor, etc.) in the referred to Patent 2,534,214, and which turns a quarter turn each time a picture is exposed and fed down. Since there are four pictures on a film strip 133, shaft 237 turns one full turn during exposing and feeding of the film strip.

The arm of switch 231 is provided with a roller 238 which rides into a notch 239 in cam 235, and thus effects momentary closing of the switch 231, as the second picture of the strip of four pictures is fed down. Switch 232 is similarly provided with a roller 241 which rests in a notch 242 in cam 234 between uses of the machine, so that roller 241 is out of the notch 242 during substantially the entire cycle of operation of the camera. Switch 232 is of a type which is open when roller 241 is in notch 242, and is closed when the roller is out of the notch.

Referring again to Figure 26, a pair of conventional latching relays 243 and 244 are illustrated schematically, the first relay 243 having two coils 246 and 247, and the second relay 244 having two coils 248 and 249. Coil 246 is provided with an armature, indicated at 251, which upon energization of coil 246 effects shifting of a contact arm 252 from the illustrated upper position to a lower position. As soon as this lower position is reached, the armature 253 of coil 247 prevents return movement of contact arm 252 until the coil 247 is energized. It follows that energization of coil 246, whether momentary or continuous, effects maintenance of contact arm 252 in its lower position, and this position is continued until energization of coil 247 occurs.

Relay 244 operates in the same manner as relay 243, and is provided with an armature 254 adapted upon energization of coil 248 to shift two contact arms 256 and 257 from the illustrated upper positions to lower positions. These arms remain in the lower positions until energization of coil 249 effects shifting of its armature 258.

The various described elements in the circuit of Figure 26 are connected between lines 261 and 262 which are supplied with power from a suitable supply, indicated at 263, and which may be a conventional 110 volt 60 cycle source.

*Operation*

There will next be described a full cycle of operation. Let it be assumed that the apparatus is in the position assumed between uses and when no developing is in progress, with all the film carriers 129 in their inner positions as shown in Figure 1, with the timing and carrier selector mechanism 130 in the position shown in Figure 12, and with the various switches of the apparatus in the positions shown in Figures 26 and 27. The film strip carrier means 43 are then in their extreme upper position since cam follower roller 103 (Figure 3) is resting on cam portion 114 adjacent drop 117. Furthermore, the apparatus is about ready for indexing of the film strip carrier means, actuator 93 (Figures 5 and 6) being adjacent gear 62.

As shown in Figure 26, when the switches are in the illustrated positions a circuit is completed from line 261 through lead 266 to contact arm 252, then through lead 267 to contact arm 256, and then through lead 268 and through the parallel connected coin return solenoid 228 and warning light 229 to line 262. Coin return solenoid 228 is thus energized, which means that its plunger will be out of the way of a coin and no return of the coin to the customer will be effected, and warning light 229 is energized to instruct a customer that the machine is ready for operation.

As soon as a coin is dropped in the coin slot 36 by the customer, a circuit is momentarily completed from line 261 through leads 266, 267 and 268, coin switch 227, and relay coil 246 to lead 269 running to line 262. The resulting energization of coil 246 effects shifting of contact arm 252 away from its contact to lead 267, which breaks the circuit to coin return solenoid 228, warning light 229 and coin switch 227. Instead, a circuit is completed from line 261 through lead 266, contact arm 252 and leads 271 and 272 to the camera motor 233 and line 262. Arm 252 remains in engagement with its contact to lead 271 due to the latching action previously described, and until energization of coil 247 as will be described subsequently. From the above it will be seen that the warning light 229 is de-energized and the coin return solenoid 228 is also de-energized, which means that any subsequent coin dropped into the coin slot will be returned out the coin return chute and will not affect the operation of the apparatus. Furthermore, the camera motor 233 is energized to start the camera cycle.

The camera cycle is described in detail in Patent 2,534,214 and in my co-pending application Serial No. 468,179, and results in exposing of the first picture on film strip 133 and thereafter in turning of shaft 237 (Figure 27) to feed this first exposed picture down through aperture 206 toward the developer mechanism. The shaft 237 turns one quarter of a revolution, causing notch 242 to ride away from roller 241 of switch 232 so that the latter is actuated to closed position. This operates through lead 273 and the connected lead 272 to create a second source of power maintaining energization of camera motor 233.

The camera cycle then continues and effects exposing of the second picture on film strip 133, after which shaft 237 turns another quarter revolution and roller 238 of switch 231 rides into notch 239 and effects momentary closing of the switch 231. Closing of switch 231 creates a circuit from line 261 through lead 274 to coil 247 and thence through leads 276 and 269 to line 262. The resulting energization of coil 247 effects shifting of contact arm 252 back to its original position contacting to lead 267, which breaks the first energization circuit to the camera motor 233. The motor continues to operate, however, being energized through the circuit including switch 232. Momentary closing of switch 231 also creates a circuit from line 261 through lead 274, lead 277, coil 248 and lead 269 to line 262. Coil 248 is thus energized to cause shifting of the contact arms 256 and 257 away from the illustrated positions. It is pointed out that although the described shifting of contact arm 252 back to its original position would appear to effect re-energization of coin return solenoid 228 and warning light 229, this result does not follow since the described shifting of contact arm 256 prevents the circuit to the coin return solenoid and warning light from being completed.

The described shifting of contact arm 257 creates a circuit from line 261 through lead 266, lead 278, contact arm 257, lead 279 and solenoid 142 to line 262. Solenoid 142 is thus energized to shift its plunger 143 from the position shown in Figure 13 to that shown in Figure 14, effecting corresponding shifting of slide 144 to the left as viewed in those figures. Since, as previously stated, the film strip carrier means including spider 121 is initially at its extreme upper position, drive pin 183 is also in its upper position maintaining latch pin 196 out of engagement with stop 198 on the second slide 146. Accordingly, the shifting of slide 144 operates through spring 147 to shift the second slide 146 to its position effecting lowering of pin 132 and elevation of pin 131.

The described shifting of slide 144 also operates through hook 174 to release the holding pawl 169 from the position shown in Figure 12 to that shown in Figure 16, so that ratchet wheel 161 is spun counterclockwise by spring 163 and to the position shown in Figure 16. Pin 164 is thus disengaged from lever 189, which permits the spring 192 to pivot that lever clockwise and effect closing of the main motor switch 193.

The resulting energization of the main motor 46 operates through pulleys 78 and 81 and belt 79 to drive the shaft 82 (Figures 3 and 4) and thus rotate cam 101, shaft 87 and intermittent drive disc 89 in a counterclockwise direction as viewed in Figure 3. The roller 103 being initially on cam section 114 adjacent drop 117, such counterclockwise cam rotation causes the roller 103 to ride down the portion 117 and cause a slight lowering of the film strip carrier means 43 from their uppermost position to their indexing position. Actuator 93 (Figures 5 and 6) then comes into engagement with gear 62 and causes it (and thus the film strip carrier means) to index one tooth or 1/44 of a revolution. During this indexing, the depressed pin 132 engages cam surface 136 of a cam member 126 (Figure 18) and causes the associated film strip carrier 129 to pivot outwardly about pivot point 124 and to its outer position. This film strip carrier is then directly above tank 41a (Figures 2, 8 and 25). The described swinging of the film strip carrier 129 from its inner to its outer position is, of course, without interference from the rollers 204 of feed down mechanism 202 due to the slight lowering of the film strip carrier means as described.

As the cam 101 continues to rotate (Figure 3), the roller 103 rides off portion 116 to result in lowering of the swung out film strip carrier 129 into tank 41a, after which the portions 113 of the cam effect slight reciprocation of the carrier to provide a washing action. Since tank 41a is filled with water, the carrier is thus rendered clean for reception of the film strip 133.

It is pointed out that during the time the developing cycle is commencing as described, the camera cycle is being completed by exposure and feed down of the third and fourth pictures on film strip 133. As the fourth picture is fed down, shaft 237 (Figure 27) rotates through its final quarter turn so that notch 242 in cam 234 rides beneath roller 241 and effects opening of switch 232 to de-energize the camera motor 233 and stop the camera cycle. The four exposed pictures (strip 133) are then in the fed down position between walls 207 and 208 as shown in Figure 10.

The developer cycle continues by rotation of cam 101 (Figure 3) until roller 103 rides up onto the high portion 114 of the cam, causing shifting of the film strip carrier means 43, including carriers 129, to the uppermost position as shown in Figures 9 and 10. The mouth of the operative film strip carrier 129 is then positioned accurately over the feed portion 213 of the feed down mechanism, due to the operation of the anti-backlash means as described heretofore, and the upper surface of cam member 126 effects closing of the switch 212 (Figures 11 and 26) to energize the feed down motor 211. This energization of feed down motor 211 is through a circuit from line 261 through lead 281 to line 262, the lead 281 also connecting to the cut off solenoid 214 previously described. Energization of the cut off solenoid operates, as described in Patent 2,534,214, to cut off the film strip 133 from the film roll remaining in camera 34. The cut off film strip 133 is then fed down into carrier 129 due to driving of rolls 204 from motor 211.

Referring again to Figure 26, the closing of switch 212 also completes a circuit through lead 281, lead 282, coil 249, lead 283 and lead 269 to line 262. Coil 249 is thus energized to effect shifting of contact arms 256 and 257 back to their positions shown in the drawing. The circuit through contact arm 257 to solenoid 142 is thus broken, so that spring 151 becomes operative to shift solenoid plunger 143 and slides 144 and 146 from their Figure 14 position to their Figure 13 position. Pin 132 is thus elevated and pin 131 depressed, which means that upon the next indexing of the film strip carrier means the second carrier 129 will not be swung out from its inner to its outer position. The shifting of contact arm 256 again completes the circuit to coin return solenoid 228, coin switch 227 and warning light 229, which sets up the apparatus for reception of a second coin.

It is pointed out that when the film strip carrier means 43 are in their uppermost positions and with the swung out carrier 129 above tank 41a as described, the vertical drive pin 183 of the mechanism 130 is, as shown in Figure 8, registered with an aperture 188 in spider 121. This being the case, the pin 183 will remain in its lower position despite the fact that the spider is in its uppermost position, and the only operation of the timer mechanism occurring at this time will be pivoting of holding pawl 169 into engagement with ratchet wheel 161 due to the fact that the slide 144 and hook member 174 are shifted to their initial positions upon de-energization of solenoid 142.

Continued clockwise rotation of cam 101 (Figure 3) will next cause the slight dropping of the film strip carrier means 43 as before, then indexing thereof as the actuator 93 (Figures 5 and 6) rides by the gear 62, and finally dipping of the carrier 129 and film strip 133 into the first tank, numbered 41c, containing developer. The actual developing cycle is thus initiated and upon the next movement of the film strip carrier means to its uppermost position, when cam follower roller 103 is on cam portion 114, the spider 101 will engage and elevate actuating pin 183 (Figure 12) to effect movement of the actuating pawl 170 and thus rotate ratchet wheel 161 clockwise for one step. The cycle then continues while the film strip 133 is operated upon by the various fluids in tanks 41. The drive or actuating pin 183 of the timer is engaged to effect clockwise rotation of ratchet wheel 161 one step after every second index of the film strip carrier. No ratchet rotation occurs after the remaining indexes due to the spacing of holes 188 in the spider as shown in Figure 8.

After the film strip 133 has been fully developed due to its dipping into the various tanks 41, following almost a full revolution of the spider 121, the swung out or operating carrier 129 comes to a position above tank 41b shown in Figures 8 and 25 and containing water. The carrier 129 is then dipped into that tank to finish washing of the film strip 133, after which the carrier 129 is elevated to the extreme upper position shown in Figure 22. The upper surface of cam 126 then engages and closes switch 226 to effect energization of the delivery unit motor 224, so that the rollers 218 and 219 are driven to draw the developed film strip 133 out of the carrier 129 and convey it to discharge chute 222.

The film strip 133 having been discharged, the spider 121 drops to the Figure 24 position, where the film carrier is clear of the delivery unit 216, and again indexes. This next indexing of the carrier means effects engagement of the depressed pin 131 with curved cam surface 134, as shown in Figure 19, to pivot the carrier 129 inwardly to its inner position above central chamber 42. The cycle will then continue until the carrier which was employed in developing the film strip arrives adjacent the tank 41c shown in Figures 8 and 25, or after 16 indexes of the film strip carrier means. As the carrier is lifted to its uppermost position over the central chamber 42 adjacent tank 41c, drive pin 183 (Figure 12) is operated to shift pawl 170 and thus ratchet wheel 161 until pin 164 depresses the left end of lever 189 and thus effects opening of switch 193 to complete the cycle.

In the above description of the cycle of operation it was assumed that only one coin was placed in the apparatus, so that it was necessary to employ only one film strip carrier 129 as described. It is pointed out that during processing of the film in the operative film strip carrier, the remaining film strip carriers were never immersed in any developing or rinse fluid and therefore could not effect pollution and contamination of the various liquids, being instead lowered into the central chamber 42 as illustrated in Figure 2.

Let it next be assumed that during a previous developing cycle (after closing of switch 212) a second coin is placed in the coin slot 36 and that the time of coin insertion happens to be such that solenoid 142 becomes energized while spider 121 is in its uppermost position as shown in Figure 13. The resulting movements of solenoid plunger 143 will then operate to shift slide 144 and the hook 174 to pivot holding pawl 169 away from ratchet wheel 161, so that spring 163 will rotate the ratchet wheel back to the starting position shown in Figure 16. The wheel 161 being again in its starting position, it follows that the apparatus will run a second full cycle of operation (sixteen indexes of the film strip carrier means) or until the second film strip is completely developed and discharged.

Since it is assumed that solenoid 142 is energized and slide 144 is shifted when spider 121 is in the uppermost position, the horizontal latch pin 196 will be held by drive pin 183 and pawl 170 in its position above the stop 198, as viewed in Figure 13, which means that the slide 146 will be shifted with slide 144 to effect lowering of pin 132 and elevation of pin 131. The next carrier assembly which moves by the pin 132 will then be shifted from its inner to its outer position, and the sequence of events will be the same as in a situation where only one coin is deposited. Of course, if the next succeeding carrier happens to be already in its outer position, the pin 132 will have no effect, the result instead being to prevent pin 131 from shifting the carrier from its outer to its inner position.

In the event that the second coin is deposited at such a time that the spider 121 is not in its uppermost position when solenoid 142 becomes energized, the latch pin 196 will be in its lower position (Figure 15) and will prevent shifting of slide 146. Solenoid energization will then shift only slide 144 and the associated pin 174, to release the ratchet wheel, and the pins 131 and 132 will remain stationary. However, as soon as the spider 121 again comes to its uppermost position to actuate the drive pin 183, pin 196 will be elevated and the stretched spring 147 will draw the second slide 146 into engagement with slide 144 to cause shifting of the carrier selector pins 131 and 132. The described arrangement by which the pins 131 and 132 may only be shifted when the spider 121 is in its uppermost position insures, as stated heretofore, that the pins will never foul with the upper surfaces of carrier cams 126 during indexing of the carrier means.

It is important that the cam drop 117 shown in Figure 3 is insufficient to cause plug 72 to disengage the spring pressed ball 68. It follows that no backlash or play will be present during indexing of carrier means 43, which is important in insuring that carrier selector pins 131 and 132 will cooperate properly with carrier cams 126.

The relays 243 and 244 may be purchased from the Leach Relay Company, 5915 Avelon Boulevard, Los Angeles 3, California, as interlocking relay number 9177.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. An automatic apparatus for exposing and developing photographic films, which comprises camera means, a plurality of tanks adapted, respectively, to contain various developing and rinsing liquids, film carrier means including a plurality of individual film carriers mounted one adjacent each of said tanks, means to effect upward and downward reciprocation of said film carrier means, selector means to actuate the individual film carriers between first positions at which said reciprocation of said film carrier means effects dipping of said individual film carriers into its adjacent tanks and second positions at which said individual film carriers remain clear of said adjacent tanks, means to effect indexing of said film carrier means for sequential dipping into said tanks of those film carriers which are in said first positions, conveyor means to convey film from said camera means to said individual film carriers, and means interconnecting said camera and selector means and operable to effect shifting of an individual carrier to said first position only in response to the operation of said camera means to expose film thereby indicating said carrier is required for developing the exposed film.

2. In an apparatus for exposing and developing photographic films, a plurality of tanks adapted, respectively, to contain various developer and rinse liquids, a film carrier support, drive means to reciprocate said support upwardly and downwardly and to index said support horizontally when said support is in an upper position, a plurality of film carriers mounted on said support and movable relative thereto between first positions at which said carriers are respectively dipped into said tanks when said support is in a lower position and second positions at which said carriers are clear of said tanks when said support is in said lower position, and means including carrier selector means selectively operable to shift carriers charged with film between said first and second positions whereby carriers charged with film are advanced progressively from tank to tank and whereby carriers not charged with film are advanced through a path clear of said tanks.

3. In an apparatus for exposing and developing photographic films, camera means, a plurality of tanks adapted, respectively, to contain various developer and rinse liquids, a film carrier support, drive means to reciprocate said support upwardly and downwardly and to index said support horizontally when said support is in an upper position, a plurality of film carriers mounted on said support and movable relative thereto between first positions at which said carriers are respectively dipped into said tanks when said support is in a lower position and second positions at which said carriers are clear of said tanks when said support is in said lower position, carrier selector means mounted adjacent the paths of horizontal travel of said film carriers due to said indexing of said support, said carrier selector means being movable between one position at which it is engaged by a film carrier traveling therepast when the latter is in said first position and when so engaged will effect shifting of said carrier from said first position to said second position, and another position at which it is engaged by a film carrier traveling therepast when the latter is in said second position and when so engaged will effect shifting of said carrier from said second position to said first position, and control means associated with said camera means for operating said carrier selector means.

4. The invention as claimed in claim 3, in which said film carriers are pivotally mounted on said carrier support, and said film carriers and said carrier selector means include a cam and cam actuator for effecting pivoting of said carriers transverse to said paths of horizontal travel and between said first positions and said second positions.

5. The invention as claimed in claim 3, in which said carrier support is a horizontally disposed spider mounted on a vertical shaft rotated and reciprocated by said drive means, said tanks are arranged in a circle around said spider, and said film carriers are pivotally mounted on the arms of said spider for radial shifting by said carrier selector means.

6. The invention as claimed in claim 3, in which means are provided to feed exposed film from said camera means to a point in the path traveled by said film carriers when said film carriers are in said first positions, and in which said control means operate to cause a film carrier to be in said first position at said point when there is an exposed film present at said point for feeding into said carrier.

7. The invention as claimed in claim 3, in which means are provided at a point in the path traveled by said film carriers, when said film carriers are in said first positions, to withdraw a developed film from a carrier and deliver the same to a discharge location, and in which said control means operate to cause shifting of said carrier from said first position to said second position after withdrawal of said developed film therefrom.

8. In an automatic photographic apparatus, camera means film carrier means, stationary conveyor means to convey film from said camera means to said carrier means and from said carrier means to a discharge point, a plurality of developing tanks, and drive means to operate said carrier means, said drive means operating to shift said carrier means to a first elevated position in close proximity to said conveyor means for reception and withdrawal of film, to shift said carrier means to a second elevated position at which said film is dipped into said tanks, to shift said carrier means to a third elevated position at which said carrier means is clear of said tanks and of said conveyor means, and to index said carrier means horizontally when the same is in said third elevated position and for a distance sufficient to cause said film to be dipped into different tanks upon subsequent shifting of said carrier means to said second elevated position.

9. The invention as claimed in claim 8, in which said film carrier means comprises a carrier support driven by said drive means, and a plurality of individual film carriers mounted on said carrier support and movable horizontally relative thereto between first locations and second locations, said first locations including means so arranged that said carriers are dipped into the respective tanks when said carrier means is at said second elevated position, said second locations including means so arranged that said carriers are clear of the respective tanks when said carrier means is at said second elevated position; and carrier selector means operable to shift said carriers between said first and second locations.

10. The invention as claimed in claim 9, in which said carrier selector means is fixedly mounted at generally the same elevation as said conveyor means and is adapted to be engaged by the individual carriers when said carrier means is at said third elevated position and is indexing, and means provided to actuate said carrier selector means between a condition effecting shifting of said carriers to said first locations and a condition effecting shifting of said carriers to said second locations.

11. The invention as claimed in claim 10, in which means are provided to prevent said actuation of said carrier selector means when said carrier means is in said third elevated position.

12. The invention as claimed in claim 10, in which said actuator means for said carrier selector means is responsive to the exposing of a film by said camera means and the conveying of said film from said camera means to said carrier means by said conveyor means.

13. The invention as claimed in claim 8, in which backlash eliminator means are provided to insure accurate registry of said carrier means with said conveyor means when said carrier means is in said first elevated position.

14. An automatic coin-operated photographic apparatus, which comprises means to define a photographic dark room, a horizontal support mounted at the upper end portion of said dark room, camera means mounted above said support, a plurality of developer and rinse tanks mounted in said dark room below said support, said tanks being arranged generally in a circle and defining a central chamber therebetween, a spider disposed in said dark room above said tanks and mounted on a vertical shaft extending generally axially of said central chamber, a plurality of individual film carriers pivotally mounted on the respective arms of said spider for movement between outer positions above said tanks and inner positions above said central chamber, carrier selector means mounted at the underside of said support and movable between a first condition effecting pivoting of said carriers from said outer positions to said inner positions, and a second condition effecting pivoting of said carriers from said inner positions to said outer positions, film feed down means fixedly mounted on said support for conveying an exposed film from said camera means to a point on one side of said carrier selector means and adjacent the path of movement of said carriers when in said outer positions, film delivery means fixedly mounted on said support and located at a point on the other side of said carrier selector means and adjacent the path of movement of said carriers when in said outer positions, first drive means associated with said shaft for rotating the same to index said carriers to above various ones of said tanks, and second drive means associated with said shaft for causing said carriers and spider to be at a first elevation during said indexing thereof, said first elevation being such that said carriers and spider are clear of said tanks and said film feed down and delivery means but said carriers engage said carrier selector means during said indexing, said second drive means also operating to elevate said carriers and spider to a second elevation at which carriers in said outer positions are in close proximity to said film feed down and delivery means, and to lower said carriers and spider to a third elevation at which said carriers are selectively immersed in said tanks and disposed in said central chamber depending upon whether said carriers are in their inner or outer positions.

15. The invention as claimed in claim 14, in which means are provided to move said carrier selector means between said first and second conditions in response to the presence of an exposed film in said film feed down means and means are provided to associate said spider and said carrier selector means to prevent said movement of said carrier selector means except when said carriers and spider are at said second elevation.

16. The invention as claimed in claim 14, in which timer means are provided on said support and are driven by said spider during movement thereof between said first and second elevations.

17. The invention as claimed in claim 14, in which means are provided to effect operation of said film feed down means and film delivery means in response to movement of a carrier to said second elevation when adjacent thereto and in said outer position, whereby a film is fed into or withdrawn from said carrier.

18. The invention as claimed in claim 14, in which backlash eliminator means are associated with said first drive means for insuring that certain of said carriers will be in exact registry with said film feed down and delivery means when said carriers are at said second elevation and in said outer positions.

19. In an automatic photographic apparatus, camera means, means to contain separately a plurality of developer and rinse liquids, film carrier means, motor means to move said film carrier means to effect dipping thereof into various ones of said liquids, a timer mechanism adapted when in one position to stop said motor means and when in another position to start said motor means, means responsive to operation of said camera means for causing movement of said timer mechanism from said one position to said other position, and means driven by said film carrier means for causing movement of said timer mechanism back to said one position after completion of a developing cycle.

20. In an apparatus for exposing and developing photographic films, camera means, a plurality of tanks adapted, respectively, to contain various developing and rinsing liquids, a film carrier support, drive means to reciprocate said support upwardly and downwardly and to index said support horizontally when said support is in an upper position, a plurality of film carriers mounted on said support and movable relative thereto between first positions at which said carriers are respectively dipped into said tanks when said support is in a lower position and second positions at which said carriers are clear of said tanks when said support is in said lower position, carrier selector means shiftable between one position effecting movement of said carriers from said first positions to said second positions, and another position effecting movement of said carriers from said second positions to said first positions, a timer mechanism adapted when in one position to stop operation of said drive means and when in another position to start operation thereof, means responsive to operation of said camera means for causing movement of said timer mechanism from said one position to said other position and also for shifting said carrier selector means to said other position, and means for returning said timer mechanism to said one position and said carrier selector means to said one position at the end of predetermined operating periods.

21. The invention as claimed in claim 20, wherein the last named means includes drive means operated by said film carrier support each time it reaches a predetermined elevated position.

22. The invention as claimed in claim 21, in which said drive means additionally operates to prevent shifting of said carrier selector means except when said film carrier support is in said predetermined elevated position.

23. A timer and carrier selector mechanism for an automatic photographic apparatus including a camera and a movable film carrier support, said carrier support having a plurality of individual film carriers movably mounted thereon; which comprises a ratchet wheel, means to bias said ratchet wheel toward a first position, actuating pawl means to rotate said ratchet wheel from said first position in step by step movement to a second position, holding pawl means to hold said ratchet wheel in any stepped position and against the bias of said bias means, control means for said automatic photographic apparatus and associated with said ratchet wheel for operation thereby when said ratchet wheel is in said second position, selector means adapted to select various film carrier by effecting shifting of said film carriers relative to said carrier support, actuator means adapted to respond to operation of said camera for operating said selector means and temporarily releasing said holding pawl means, and means adapted to be operated by said film carrier support for driving said actuating pawl means.

24. The invention as claimed in claim 23, in which latch means are provided to latch said selector means against movement in a given direction, said latch means being adapted to be released by said carrier support when the latter is in a given position.

25. In an automatic photographic apparatus, camera means, film carrier means including a plurality of film carriers movable between operative and inoperative positions, means to effect sequential immersing into a plurality of developer fluids of those film carriers which are in said operative positions, conveyor means to deliver an exposed film from said camera means to a point in the path of movement of said operative film carriers and from said point into an operative film carrier, carrier selector means responsive to operation of said camera means to effect movement of an unloaded film carrier from an inoperative position to an operative position at said point, and means responsive to arrival of said unloaded film carrier at said operative position at said point to drive said conveyor means to load said unloaded film carrier.

26. The invention as claimed in claim 25, in which said camera means is adapted to expose a plurality of pictures on a single film strip, and said carrier selector means is so related to said camera means that said unloaded film carrier is moved from inoperative to operative position prior to exposing of the last picture on said strip.

27. The invention as claimed in claim 25, in which film withdrawal and delivery means are provided at a second point in the path of movement of said operative film carriers, and means responsive to arrival at said second point of a loaded film carrier in operative position is provided to operate said withdrawal and delivery means.

28. In an automatic apparatus for developing exposed photographic film, a photographic dark chamber, a plurality of tanks adapted to contain various developing and rinsing liquids, power-driven indexing conveyor means having movably supported thereon a plurality of film carriers, said carriers being adapted to be indexed in increments by said conveyor means along said row of tanks selectively in a first path to one side of said row of tanks and in a second path overlying said row of tanks, means for charging selective ones of said carriers with exposed film to be developed, means for shifting only carriers charged with film into said second path while the carriers are held elevated above said tanks, and means effective to lower the carriers to a level substantially below the liquid level in said tanks between the indexing of said conveyor means along said row of tanks.

29. In an automatic apparatus for developing exposed photographic film, a photographic dark chamber, a plurality of tanks arranged in a row and adapted to contain various developing and rinsing liquid, power-driven indexing conveyor means having a plurality of separate film carriers mounted thereon and operable to index said carriers sequentially along said row of tanks including means causing said carriers to dwell adjacent said row of tanks, means for moving said carriers up and down while in dwell position, means for shifting any carrier containing film from a position laterally to one side of said row of tanks to a position overlying said tanks while being indexed forwardly along said row of tanks, said indexing conveyor means including means for lowering said carriers to a position substantially below the liquid level in said tanks during periods of dwell whereby the carriers containing film are submerged in liquid and carriers lacking film are lowered laterally to one exterior side of said row of tanks without being submerged in liquid.

30. A film carrier assembly for an automatic photographic apparatus, said assembly comprising a spider having a plurality of arms and adapted to be rotated about an axis generally perpendicular to the plane thereof, a cam member pivotally mounted on each arm of said spider for movement in a plane generally parallel to said axis of rotation, a film carrier mounted on each of said cam members and movable along therewith, and cam actuator means movable into and out of the path of said cam members and operable when in the path of any one of said cam members to move the cam member and the film carrier mounted thereon between first and second pivoted positions at different radial positions from said axis of rotation.

31. The invention as defined in claim 30 in which over center springs are mounted between said spider and cam members and are effective to prevent the latter from remaining at positions intermediate said first and second pivoted positions.

32. In an apparatus for developing photographic film and of the type having a film developing dark room provided with a plurality of tanks adapted to contain various developing and rinsing liquids, a plurality of film carriers, means for charging film to be developed selectively into any number of said carriers, that improvement which comprises means for indexing said carriers through two paths in one of which paths all carriers passing therealong are brought into contact with the liquid contents of said tanks and in the other of which paths carriers passing therealong do not contact liquid in any of said tanks, and means for routing carriers charged with film along said one path and carriers lacking a film charge along the other of said paths, whereby the contamination of the liquid contents of said tanks by said non-film charged carriers is avoided.

33. Apparatus as defined in claim 32 characterized in that said carrier indexing means includes means for simultaneously bringing all carriers charged with film into contact with the liquid contents of a tank underlying the respective film-charged carriers, and means for elevating all of said film-charged carriers above said tanks while indexing the same simultaneously to the next dipping position above said tanks.

34. In an automatic photographic apparatus, camera means, a plurality of developer and rinse tanks, a plurality of film carrier means including means for advancing said carrier means progressively through said tanks to develop film exposed by said camera means, motor means to move said film carrier means to effect dipping of the carrier means into various ones of said tanks, timer means to discontinue the operation of said motor means after a loaded film carrier means has completed passage through said tanks, means responsive to the operation of said camera means for starting the operation of said timer means, and means effective to reset the timing period of said timing means at zero position during any part of a timing operation in response to the operation of said camera means to deliver additional film to be developed.

References Cited in the file of this patent

UNITED STATES PATENTS

| | | |
|---|---|---|
| 516,076 | Burton | Mar. 6, 1894 |
| 519,872 | Parsons | May 15, 1894 |
| 1,816,290 | Klimis | July 28, 1931 |
| 1,825,709 | Bacino | Oct. 6, 1931 |
| 1,985,554 | Smith | Dec. 25, 1934 |
| 2,183,742 | Hershberg | Dec. 19, 1939 |
| 2,194,345 | Winans | Mar. 19, 1940 |
| 2,378,217 | Hansen | June 12, 1945 |
| 2,380,378 | Allen | July 31, 1945 |
| 2,386,781 | Daly | Oct. 16, 1945 |
| 2,518,034 | Ludwig | Aug. 8, 1950 |
| 2,527,959 | Quinn | Oct. 31, 1950 |
| 2,541,016 | Allen | Feb. 13, 1951 |
| 2,545,031 | Izzi | Mar. 13, 1951 |
| 2,623,650 | Allen | Dec. 30, 1952 |

FOREIGN PATENTS

| | | |
|---|---|---|
| 626,727 | Germany | Mar. 5, 1936 |

UNITED STATES PATENT OFFICE

CERTIFICATE OF CORRECTION

Patent No. 2,916,976            December 15, 1959

Marvin C. Applegate et al.

It is hereby certified that error appears in the printed specification of the above numbered patent requiring correction and that the said Letters Patent should read as corrected below.

Column 4, line 15, for "legs 38" read -- legs 39 --; column 7, line 11, strike out "cam follower roller 103 engages a low point on cam 101".

Signed and sealed this 2nd day of August 1960.

(SEAL)
Attest:
KARL H. AXLINE
Attesting Officer

ROBERT C. WATSON
Commissioner of Patents